(12) United States Patent
Yoshibayashi

(10) Patent No.: US 7,914,957 B2
(45) Date of Patent: Mar. 29, 2011

(54) PRODUCTION METHOD FOR COLOR FILTER

(75) Inventor: Mitsuji Yoshibayashi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 874 days.

(21) Appl. No.: 11/843,911

(22) Filed: Aug. 23, 2007

(65) Prior Publication Data

US 2008/0053953 A1    Mar. 6, 2008

(30) Foreign Application Priority Data

Aug. 23, 2006 (JP) ................. 2006-226934
Dec. 28, 2006 (JP) ................. 2006-355572

(51) Int. Cl.
*G03F 1/00* (2006.01)

(52) U.S. Cl. ............... 430/7; 430/311; 430/321

(58) Field of Classification Search ............... None
See application file for complete search history.

(56) References Cited

U.S. PATENT DOCUMENTS

| 5,439,582 | A | * | 8/1995 | Oka et al. ................. 205/135 |
| 5,503,952 | A | * | 4/1996 | Suzuki et al. ............... 430/7 |
| 5,756,400 | A | * | 5/1998 | Ye et al. ................... 438/710 |
| 5,792,710 | A |   | 8/1998 | Yoshida et al. |
| 6,159,862 | A | * | 12/2000 | Yamada et al. ............. 438/712 |
| 2002/0001963 | A1 |   | 1/2002 | Tadokoro et al. |
| 2004/0185588 | A1 | * | 9/2004 | Fukuyoshi et al. ......... 438/22 |
| 2004/0214445 | A1 |   | 10/2004 | Shimizu et al. |
| 2005/0215675 | A1 | * | 9/2005 | Nishida et al. ............. 524/99 |
| 2006/0270220 | A1 |   | 11/2006 | Saitoh et al. |
| 2007/0105035 | A1 | * | 5/2007 | Yokoi et al. ............... 430/256 |

FOREIGN PATENT DOCUMENTS

| JP | 55-146406 A | 11/1980 |
| JP | 59146005 A | 8/1984 |
| JP | 01296201 A | 11/1989 |
| JP | 10341012 A | 12/1998 |
| JP | 2001-249218 A | 9/2001 |

OTHER PUBLICATIONS

European Search Report Dated Jan. 4, 2008.
EP Communication, dated Jul. 2, 2009, issued in corresponding EP Application No. 07016460.3, 4 pages.

* cited by examiner

*Primary Examiner* — Duy-Vu N Deo
(74) *Attorney, Agent, or Firm* — Sughrue Mion, PLLC

(57) ABSTRACT

The present invention provides a production method for a color filter including forming a first colored layer on a support, forming a photoresist layer on the first colored layer, forming an image on the first colored layer by removing the photoresist layer in the form of an image pattern, etching the first colored layer in the form of the image formed in the forming the image by use of a dry etching process that uses a mixed gas in which a fluorine-based gas and oxygen ($O_2$) are mixed at a mixing ratio (fluorine-based gas/$O_2$), by flow rate ratio, in the range of from 2/1 to 8/1, and removing the photoresist layer remaining after the etching.

13 Claims, 8 Drawing Sheets

PRODUCTION METHOD FOR COLOR FILTER

CROSS-REFERENCE TO RELATED APPLICATION

This application claims priority under 35 USC 119 from Japanese Patent Application Nos. 2006-226934 and 2006-355572, the disclosures of which are incorporated by reference herein.

BACKGROUND OF THE INVENTION

1. Field of the Invention

The invention relates to a production method for a color filter which uses a dry etching process.

2. Description of the Related Art

As a method of a color filter for preparing liquid crystal display elements or solid state image pick-up elements, a staining method, a printing method, an electrodeposition method and a pigment dispersion process are known.

The pigment dispersion process is a method of using a radiation sensitive colored composition in which a pigment is dispersed in various photosensitive compositions and producing a color filter by photolithographic method. Since pigments are used in the method, the filter is stable to light, heat, or the like. Further, since patterning in this method is conducted by photolithographic method, registering accuracy is also sufficient and it is considered that the method is suitable for producing color filters for use in large screen color displays or high-definition color displays. Therefore, the method is generally used.

In the case of producing a color filter by the pigment dispersion process, a radiation sensitive composition is coated on a glass support by using a spin coater, a roll coater or the like and drying to form a coating film. Then, colored pixels are obtained by pattern-exposing and developing the coated film. The color filter can be prepared by repeating this process a number of times corresponding to the desired number of color hues.

As the pigment dispersion process, a negative working photosensitive composition in which a photopolymerizable monomer and a photopolymerization initiator are combined with alkali soluble resin is disclosed (e.g., see Japanese Patent Application Laid-Open (JP-A) Nos. 2-181704, 2-199403, 5-273411).

Recently, a further high-definition has been desired for color filters for use in solid image pick-up elements. However, conventional pigment dispersion systems have difficulties in further improving the definition. Further, Because of problems such as generation of color irregularities due to coarse particles of the pigment, a further improvement in the definition is very difficult.

In view of these problems, a technology that uses a dye in place of the pigment has been proposed (e.g., see Japanese Patent Application Laid-Open (JP-A) Nos. 6-75375). However, a curable composition that uses a dye has a problem in that various properties such as light-fastness, thermal resistance, solubility and coating uniformity are generally inferior to that of the pigment. Further, when it is used to prepare a color filter for solid-state imaging elements, since a film thickness of 1.5 μm or less is necessary, a large quantity of a dye has to be added to a curable composition. Accordingly, there is a problem that pattern formability especially deteriorate. For example, the adhesiveness with a substrate and the curability become insufficient and a dye in an exposed area that forms a filter comes off.

Furthermore, irrespective of a pigment or dye as a colorant, when the photolithography process is used to prepare a color filter, components other than the colorant, that is, a binder resin, a photopolymerizable compound and a photopolymerization initiator have to be used much. Accordingly, there is a problem in that a film thickness cannot be thinned.

Recently, from the viewpoint of an improvement of image quality due to reduction of the shading, a further thinner color filter is in demand. Furthermore, owing to the miniaturization of a light-receiving element and a display element, a finer pattern is demanded to form in rectangle. For example, in a liquid crystal display element and a solid-state image pick-up element, the downsizing of a pixel size is forwarded. Accordingly, the color filter also needed to miniaturize. In particular, the miniaturization of the solid-state image pick-up element is remarkable, the solid-state image pick-up element requires a high definition technology that enables to obtain a size of 2.0 μm or less. That is, the existing photolithography process is approaching the limit of the resolving power.

In comparison with a production method for a color filter in which the photolithography process is used, as a process effective for forming a thinner and finer pattern, a dry etching process has been known. The dry etching process has been used as a process of forming a pattern to an evaporated thin film of a colorant (e.g., see Japanese Patent Application Laid-Open (JP-A) Nos. 55-146406). In the dry etching process, when a thin film is formed, in comparison with the photolithography system, while maintaining the spectral characteristics in the same range, a thin film having a film thickness of one half or less of a film thickness formed by the photolithography process can be formed. Furthermore, a pattern formation process in which the photolithography process and the dry etching process are combined is proposed (e.g., see Japanese Patent Application Laid-Open (JP-A) Nos. 2001-249218).

SUMMARY OF THE INVENTION

However, when a thin film is formed by a evaporation method, a vapor deposition apparatus is inevitably contaminated and this became a large burden when a color filter is prepared. Further, since a pixel is formed by using only a pigment or a dye, the adhesiveness with a flattening film of a lower layer or an upper layer is poor, resulting in low yield.

In the production of a color filter by use of a dry etching process, when a second colored layer is formed on a first layer and etched, it is difficult to simultaneously remove a colorant of the second layer coated on the first layer and a colorant of the second layer coated on an area from which the first layer is removed.

On the other hand, in the dry etching process, after the end of the etching, a process of peeling and removing a photoresist formed as a mask for covering a non-etched region is necessary.

In view of these circumstances, the invention can provide a production method for a color filter, in which adhesion of an etching product on a sidewall area of a photoresist layer is suppressed and photoresist layer can be easily peeled because a mixing ratio of etching gases is selected.

According to a first aspect of the invention, there is provided a production method for a color filter including (a) forming a first colored layer on a support, (b) forming a photoresist layer on the first colored layer, (c) forming an image on the first colored layer by removing the photoresist layer in the form of an image pattern, (d) etching the first colored layer in the form of the image formed in the forming the image by use of a dry etching process that uses a mixed gas in which a fluorine-based gas and oxygen ($O_2$) are mixed at a mixing ratio (fluorine-based gas/$O_2$), by flow rate ratio, in the range of from 2/1 to 8/1, and (e) removing the photoresist layer remaining after the etching.

According to a production method for a color filter of the invention, when the etching is carried out by using a photoresist as a mask, a colored heat-curable composition can be formed into a desired shape. Further, when the photoresist is peeled after the etching, the photoresist on the colored layer have only to be peeled, and when an etching product adheres to a sidewall of a color filter layer, the adhered etching product may not be completely removed.

BRIEF DESCRIPTION OF THE DRAWINGS

Exemplary embodiments of the present invention will be described in detail based on the following figures, wherein:

FIG. 6 is seen from a surface opposite to a support side.

FIG. 8 is seen from a surface opposite to a support side.

DETAILED DESCRIPTION OF THE INVENTION

Forming Colored Layer

Figure 1:
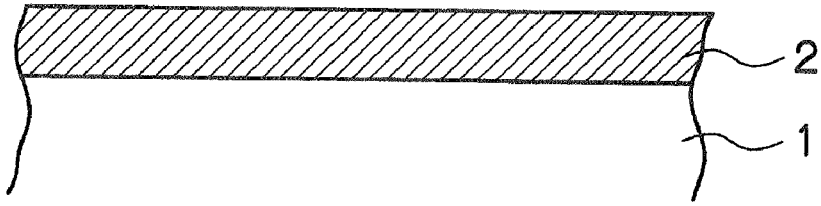
FIG. 1 is a sectional view showing a colored layer formed on a support.

A production method for a color filter of the invention includes (a) forming a colored layer on a support.
<Support>

The support of the invention includes, for example, a soda glass, a borosilicate glass, a quartz glass and ones obtained by adhering a transparent conductive film thereon, which are used for liquid crystal display elements, and a photoelectric conversion element substrate used in an image pickup element such as a silicon substrate and a complementary metal oxide semiconductor (CMOS). On the supports, a black stripe may be formed to isolate the respective pixels.

Further, if necessary, an undercoat layer may be formed on the supports in order to improve the adhesiveness with a layer of an upper area, to inhibit a material from diffusing or to flatten a surface of a support.

<Colored Layer>

A colored layer of the invention is preferably formed by using a curable composition containing a colorant. The curable composition includes a non-photosensitive colored heat-curable composition and a colored photo-curable composition.

The colored layer can constitute at least one kind of pixels of a color filter in the invention. Further, from the viewpoint of spectral characteristics, the colored layer in the invention is preferably formed by using a non-photosensitive colored heat-curable composition.

(Non-Photosensitive Colored Heat-Curable Composition)

In the invention, a non-photosensitive colored heat-curable composition is preferably used to form a colored layer. The non-photosensitive colored heat-curable composition in the invention preferably contains a colorant and a thermosetting compound and a concentration of the colorant in a total solid content is preferably 50 weight % or more and less than 100 weight %.

—Colorant—

A colorant that can be used in the invention is not particularly restricted. Known various kinds of dyes and pigments can be used by itself or in a combination of two or more thereof so far.

A pigment that can be used in the invention includes known various kinds of inorganic pigments or organic pigments so far. Further, irrespective of the inorganic pigment and organic pigment, when it is considered that high transmittance is preferable, a pigment of which average particle diameter is as small as possible is preferable, and when the handling property is considered as well, an average particle diameter of the pigment is preferably in the range of 0.01 to 0.1 μm and more preferably in the range of 0.01 to 0.05 μm.

The inorganic pigment includes metal compounds shown by a metal oxide, a metal complex or the like. Specifically, the inorganic pigment includes oxides of metals such as iron, cobalt, aluminum, cadmium, lead, copper, titanium, magnesium, chromium, zinc and antimony, and composite oxides of the metals.

The organic pigment includes, for example,

C.I. Pigment Yellow 11, 24, 31, 53, 83, 93, 99, 108, 109, 110, 138, 139, 147, 150, 151, 154, 155, 167, 180, 185, 199;

C.I. Pigment Orange 36, 38, 43, 71;

C.I. Pigment Red 81, 105, 122, 149, 150, 155, 171, 175, 176, 177, 209, 220, 224, 242, 254, 255, 264, 270;

C.I. Pigment Violet 19, 23, 32, 39;

C.I. Pigment Blue 1, 2, 15, 15:1, 15:3, 15:6, 16, 22, 60, 66;

C.I. Pigment Green 7, 36, 37;

C.I. Pigment Brown 25, 28;

C.I. Pigment Black 1, 7;

carbon black, and the like.

As the pigments that can be preferably used in the invention, the followings can be used. However, the pigments are not limited to these examples.

C.I. Pigment Yellow 11, 24, 108, 109, 110, 138, 139, 150, 151, 154, 167, 180, 185;

C.I. Pigment Orange 36, 71;

C.I. Pigment Red 122, 150, 171, 175, 177, 209, 224, 242, 254, 255, 264;

C.I. Pigment Violet 19, 23, 32;

C.I. Pigment Blue 15:1, 15:3, 15:6, 16, 22, 60, 66;

and C.I. Pigment Black 1.

The organic pigments can be used by itself or in a combination of two or more thereof. When at least two kinds thereof are combined and used, the color purity of a colored layer can be improved. Hereinbelow, specific examples of the combinations will be shown.

For example, as a red pigment, a mixture of at least one kind or more of an anthraquinone-based pigment, a perylene-based pigment and a diketopyrolopyrole-based pigment, and a disazo-based yellow pigment, an isoindoline-based yellow pigment, a quinophthalone-based yellow pigment or a perylene-based red pigment can be used. For example, the anthraquinone-based pigment includes C.I. Pigment Red 177. The perylene-based pigment includes C.I. Pigment Red 155 and C.I. Pigment Red 224. The diketopyrolopyrole-based pigment includes C.I. Pigment Red 254. From the viewpoint of the color reproducibility, C.I. Pigment Yellow 139 is preferably used to mix. Furthermore, a weight ratio of a red pigment and a yellow pigment is preferably in the range of 100:5 to 100:75. When the weight ratio of a red pigment and a yellow pigment is within the above range, the light transmittance can be suppressed and the color purity can be heightened. More preferably, the weight ratio is in the range of 100:10 to 100:50.

As the green pigment, a halogenated phthalocyanine-based pigment can be used by itself or a mixture of a halogenated phthalocyanine-based pigment and a disazo-based yellow pigment, a quinophthalone-based yellow pigment, an azomethine-based yellow pigment or an isoindoline-based yellow pigment can be used. As such an example, a mixture of C.I. Pigment Green 7, 36 or 37 and C.I. Pigment Yellow 83, C.I. Pigment Yellow 138, C.I. Pigment Yellow 139, C.I. Pigment Yellow 150, C.I. Pigment Yellow 180 or C.I. Pigment Yellow 185 is preferred. A weight ratio of a green pigment and a yellow pigment is preferably in the range of 100:5 to 100:150.

As the blue pigment, a phthalocyanine-based pigment can be used by itself or a mixture of a phthalocyanine-based pigment and a dioxazine-based violet pigment can be used. As such an example, a mixture of C.I. Pigment Blue 15:6 and C.I. Pigment Violet 23 is preferable. A weight ratio of a blue pigment and a violet pigment is preferably in the range of 100:0 to 100:30.

In the invention, when a colorant is a dye, it can be uniformly dissolved in a composition, and thereby a non-photosensitive colored thermosetting resin composition can be obtained.

A dye that can be used as the colorant is not particularly restricted, known dyes for use in a color filter can be used so far. For example, dyes disclosed in JP-A Nos. 64-90403, 64-91102, 1-94301, 6-11614, Japanese Patent No. 2592207, U.S. Pat. Nos. 4,808,501, 5,667,920, 5,059,500, JP-A Nos. 5-333207, 6-35183, 6-51115, 6-194828, 8-211599, 4-249549, 10-123316, 11-302283, 7-286107, 2001-4823, 8-15522, 8-29771, 8-146215, 11-343437, 8-62416, 2002-14220, 2002-14221, 2002-14222, 2002-14223, 8-302224, 8-73758, 8-179120 and 8-151531 can be used.

As the chemical structure, dyes such as pyrazole azo-based, anilino azo-based, triphenylmethane-based, anthraquinone-based, anthrapyridone-based, benzilidene-based, oxonol-based, pyrazolotriazole azo-based, pyridone azo-based, cyanine-based, phenothiazine-based, pyrrolo pyrazole azomethine-based, xanthene-based, phthalocyanine-based, benzopyran-based and indigo-based dyes are preferably used.

In a case of a resist system where aqueous or alkali development is conducted, an acidic dye and/or a derivative thereof can be suitably used in view of completely removing the binder and/or the dye of a area that is removed by the development.

In addition, direct dyes, basic dyes, mordant dyes, acidic mordant dyes, azoic dyes, disperse dyes, oil soluble dyes, food dyes and/or derivatives thereof as well can be usefully used.

The acidic dye is not particularly restricted as long as it has an acidic group such as a sulfonic group or a carboxylic group. However, the acidic dye is preferably selected while considering all the required characteristics such as the solubility to an organic solvent or developer, the salt-forming property with a basic compound, absorbance, an interaction with other components in the composition, light-fastness, thermal resistance, and the like.

Specific examples of the acidic dye will be shown below. However, the acidic dye are not limited to these examples. Examples thereof include acid alizarin violet N; acid black 1, 2, 24, 48; acid blue 1, 7, 9, 15, 18, 23, 25, 27, 29, 40, 45, 62, 70, 74, 80, 83, 86, 87, 90, 92, 103, 112, 113, 120, 129, 138, 147, 158, 171, 182, 192, 243, 324:1; acid chrome violet K; acid Fuchsin; acid green 1, 3, 5, 9, 16, 25, 27, 50; acid orange 6, 7, 8, 10, 12, 50, 51, 52, 56, 63, 74, 95; acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 183, 198, 211, 215, 216, 217, 249, 252, 257, 260, 266, 274; acid violet 6B, 7, 9, 17, 19; acid yellow 1, 3, 7, 9, 11, 17, 23, 25, 29, 34, 36, 42, 54, 72, 73, 76, 79, 98, 99, 111, 112, 114, 116, 184, 243; Food Yellow 3; and derivatives of such dyes.

Among those described above, dyes such as acid black 24; acid blue 23, 25, 29, 62, 80, 86, 87, 92, 138, 158, 182, 243, 324:1; acid orange 8, 51, 56, 63, 74; acid red 1, 4, 8, 34, 37, 42, 52, 57, 80, 97, 114, 143, 145, 151, 183, 217, acid violet 7; acid yellow 17, 25, 29, 34, 42, 72, 76, 99, 111, 112, 114, 116, 184, 243; Acid Green 25; and derivative thereof are preferred.

Furthermore, other acidic dyes, except the above-mentioned ones, such as azo-based, xanthene-based and phthalocyanine-based acidic dyes are preferred, and acidic dyes such as C.I. Solvent Blue 44, 38; C.I. solvent Orange 45; Rhodamine B, Rhodamine 110 and the like, and derivatives thereof can be preferably used.

A content of the colorant in a total solid content in the non-photosensitive colored heat-curable composition in the invention is, though not particularly restricted, preferably in the range of 50 to 100 weight %. When the content is 50 weight % or more, the adequate chromaticity as a color filter can be obtained. And, when the content is 100 weight % or less, the photocuring can be excellently forwarded and thereby deterioration of the strength as a film can be suppressed. Still furthermore, the development latitude can be inhibited from becoming narrow at the alkali development.

In the invention, in order to improve the dispersibility of the pigment, known pigment dispersant or surfactant can be added so far. Many kinds of compounds can be used as the dispersant. Examples thereof include phthalocyanine derivatives (commercially available product such as EFKA-745 (trade name, manufactured by EFKA Chemicals) and Solsperse 5000 (trade name, manufactured by Lubrizol Japan Limited); cationic surfactants such as olganosiloxane polymer KP341 (trade name, manufactured by Shin-Etsu Chemical Co., Ltd.), (meth) acrylic acid-based (co)polymer Poly-flow Nos. 75, 90 and 95 (trade name, manufactured by Kyoeisha Yushi Kagaku Kogyo Co., Ltd.) and W001 (trade name, manufactured by Yusho K.K); nonionic surfactants such as polyoxyethylene lauryl ether, polyoxyethylene stearyl ether, polyoxyethylene oleyl ether, polyoxyethylene octylphenyl ether, polyoxyethylene nonylphenyl ether, polyoxyethylene glycol dilaurate, polyoxyethylene glycol distearate and sorbitan fatty acid ester; anionic surfactants such as W004, W005 and W017 (trade name, manufactured by Yusho K.K); polymer dispersants such as EFKA-46, EFKA-47, EFKA-47EA, EFKA Polymer 100, EFKA Polymer 400, EFKA Polymer 401 and EFKA Polymer 450 (trade name, manufactured by Morishita Sangyo K.K), Disperse Aid 6, Disperse Aid 8, Disperse Aid 15, and Disperse Aid 9100 (trade name, manufactured by San Nopko Limited); various Solsparse dispersants such as Solsparse 3000, 5000, 9000, 12000, 13240, 13940, 17000, 24000, 26000 and 28000 (trade name, manufactured by Zeneka Co., Ltd.); and Adeka Pluronic L31, F38, L42, L44, L61, L64, F68, L72, P95, F77, P84, F87, P94, L101, P103, F108, L121 and P-123 (trade name, manufactured by Asahi Denka Kogyo K.K.) and Isonet S-20 (trade name, manufactured by Sanyo Chemical Industries, Ltd.).

—Thermosetting Compound—

The thermosetting compound that can be used in the invention, as long as it can be cured by heating, is not particularly restricted. For example, a compound having a thermosetting functional group can be used. The thermosetting compound can be preferably used have at least one group selected from an epoxy group, a methylol group, an alcoxy methyl group and an acyloxy methyl group.

The thermosetting compound available in the invention is not particularly restricted, as long as it is able to cure the layer with the thermosetting compound, and examples of the thermosetting compound include (a) epoxy compound, (b) melamine compounds, guanamine compounds, glycoluryl compounds or urea compounds substituted with at least one substituent selected from methylol group, alkoxymethyl group and acyloxymethyl group, and (c) phenol compounds, naphthol compounds or hydroxyanthrathene compounds substituted with at least one substituent selected from methylol group, alkoxymethyl group and acyloxymethyl group. A multifunctional epoxy resins are particularly preferable.

The epoxy compound in the (a), as long as the compound comprises an epoxy group and has a cross-linking property. Examples of the epoxy compound include glycidyl group-containing divalent low molecular weight compounds such as bisphenol A diglycidyl ether, ethyleneglycol diglycidyl ether, butanediol diglycidyl ether, hexanediol diglycidyl ether, dihydroxybiphenyl diglycidyl ether, diglycidyl phthalate and N,N-glycidylaniline; glycidyl group-containing trivalent low molecular weight compounds such as trimethylolpropane triglycidyl ether, trimethylolphenol triglycidyl ether and tris P-PA triglycidyl ether; glycidyl group-containing tetravalent low molecular weight compounds such as pentaerythritol tetraglycidyl ether and tetramethylol bisphenol A tetraglycidyl ether; glycidyl group-containing polyvalent low molecular weight compounds such as dipentaerythritol pentaglycidyl ether and dipentaerythritol hexaglycidyl ether; and glycidyl group-containing high molecular weight compounds such as polyglycidyl (meth)acrylate and 1,2-epoxy-4-(2-oxylanyl)cyclohexane adduct of 2,2-bis(hydroxymethyl)-1-butanol.

Further, a commercially available epoxy compounds include alicyclic epoxy compounds such as "CEL-2021", alicyclic solid epoxy resins such as "EHPE-3150", epoxidized polybutadiene such as "PB3600", flexible alicyclic epoxy compounds such as "CEL-2081" and lactone-modified epoxy resins such as "PCL-G" (all manufactured by Daicel Chemical Industries, Ltd.) can be cited. In addition to above ones, "Celloxide 2000", "Epolead GT-3000" and "GT-4000" (all manufactured by Daicel Chemical Industries, Ltd.). Among these, the alicyclic solid epoxy resin is most excellent in the curability and "EHPE-3150" is most excellent in the curability. These compounds may be used by itself or in a combination of two or more thereof or in a combination with other kinds shown below.

The numbers of the methylol groups, alkoxymethyl groups and acyloxymethyl groups substituting the melamine compounds in the (b) above are preferably 2 to 6, and the numbers of the groups above substituting the glycoluryl compounds, guanamine compounds and urea compounds, respectively, are preferably 2 to 4. More preferably, the numbers of the groups substituting the melamine compounds are 5 to 6, and the numbers of the groups substituting the glycoluryl compounds, guanamine compounds and urea compounds, respectively, are 3 to 4.

The melamine compounds, guanamine compounds, glycoluryl compounds and urea compounds are collectively named as the compounds according to (b) (methylol group-containing compounds, alkoxymethyl group-containing compounds or acyloxymethyl group-containing compounds) hereinafter.

The methylol group-containing compounds according to (b) can be obtained by heating the alkoxymethyl group-containing compounds according to (b) in an alcohol in the presence of an acid catalyst such as hydrochloric acid, sulfuric acid, nitric acid and methanesulfonic acid. The acyloxymethyl group-containing compounds according to (b) can be obtained by mixing acyl chloride with the methylol group-containing compounds according to (b) in the presence of a base catalyst.

Specific examples of the compounds according to (b) having the substituents above will be listed below.

Examples of the melamine compound include hexamethylol melamine, hexamethoxymethyl melamine and compounds having 1 to 5 methylol groups of hexamethylol melamine substituted with methoxymethyl groups, or a mixture thereof, and hexamethoxyethyl melamine, hexaacyloxymethyl melamine and compounds having 1 to 5 methylol groups of hexamethylol melamine substituted with acyloxymethyl groups, or a mixture thereof.

Examples of the guanamine compound include tetramethylol guanamine, tetramethoxymethyl guanamine and compounds having 1 to 3 methylol groups of tetramethylol guanamine substituted with methoxymethyl groups, or a mixture thereof, and tetramethoxyethyl guanamine, tetraacyloxymethyl guanamine and compounds having 1 to 3 methylol groups of tetramethylol guanamine substituted with acyloxymethyl groups, or a mixture thereof.

Examples of the glycoluryl compound include tetramethylol glycoluryl, tetramethoxymethyl glycoluryl and compounds having 1 to 3 methylol groups of tetramethylol glycoluryl substituted with methoxymethyl groups, or a mixture thereof, and compounds having 1 to 3 acyloxymethyl groups of tetramethylol glycoluryl substituted with acyloxymethyl groups, or a mixture thereof.

Examples of the urea compound include tetramethylol urea, tetramethoxymethyl urea and compounds having 1 to 3 methylol groups of tetramethylol urea substituted with methoxymethyl groups, or a mixture thereof, and tetramethoxyethyl urea.

The compounds according to (b) may be used alone, or as a combination thereof.

The compounds in the (c), that is, phenol compounds, naphthol compounds or hydroxyanthracene compounds substituted with at least one group selected from the methylol group, alkoxymethyl group and acyloxymethyl group can suppress inter-mixing of the curable resin composition with a overcoat photoresist by forming cross-links by heating as the case of the compounds in the (b), and the strength of the layer is enhanced. These compounds are collectively named as the compounds according to the (c) (methylol group-containing compounds, alkoxymethyl group-containing compounds or acyloxymethyl group-containing compounds).

At least two methylol groups, acyloxymethyl groups or alkoxymethyl groups should be contained per one molecule of the thermosetting compound in the (c). Compounds in which both the 2-position and 4-position of the phenol compound as a frame compound are substituted are preferable from the viewpoint of cross-linking ability by heating and preservation stability. Compounds in which both the ortho-position and para-position relative to the OH group of the naphthol compound or hydroxyanthracene compound as a frame compound are substituted are also preferable. The 3-position or 5-position of the phenol compound may be either substituted or unsubstituted.

Positions except the ortho-position relative to the OH group may be either substituted or unsubstituted in the naphthol compound.

The methylol group-containing compound according to the (c) may be obtained using a compound having a hydrogen atom at the ortho- or para-position (2- or 4-position) relative to the phenolic OH group as a starting material, and by allowing the material to react with formalin in the presence of a base catalyst such as sodium hydroxide, potassium hydroxide, ammonia or tetraalkylammonium hydroxide.

The alkoxymethyl group-containing compound according to the (c) may be obtained by heating the methylol group-containing compound according to the (c) in an alcohol in the presence of an acid catalyst such as hydrochloric acid, sulfuric acid, nitric acid or methanesulfonic acid.

The acyloxymethyl group-containing compound according to the (c) may be obtained by allowing the methylol group-containing compound according to the (c) to react with an acyl chloride in the presence of a base catalyst.

Examples of the frame compound of the thermosetting compound (c) include phenol, naphthol and hydroxyanthracene compounds in which the ortho- or para-position relative to the phenolic OH group is unsubstituted. Examples of the frame compound available include phenol, isomers of cresol, 2,3-xylenol, 2,5-xylenol, 3,4-xylenol, 3,5-xylenol, bisphenols such as bisphenol A, 4,4'-bishydroxybiphenyl, Tris P-PA (manufactured by Honshu Chemical Industry Co., Ltd.), naphthol, dihydroxynaphthalene and 2,7-dihydroxyanthracene.

Specific examples of the phenol compound or naphthol compound as the thermosetting compound (c) include trimethylolphenol, tri(methoxymethyl)phenol, and compounds having 1 to 2 methylol groups of trimethylol phenol substituted with methoxymethyl groups; trimethylol-3-cresol, tri(methoxymethyl)-3-cresol and compounds having 1 to 2 methylol groups of trimethylol-3-cresol substituted with methoxymethyl groups; dimethylcresol such as 2,6-dimethylol-4-cresol, tetramethylol bisphenol A, tetramethoxymethyl bisphenol A and compounds having 1 to 3 methylol groups of tetramethylol bisphenol A substituted with methoxymethyl groups; tetramethylol-4,4'-bishydroxybiphenyl, tetramethoxymethyl-4,4'-bishydroxybiphenyl, hexamethylol compounds of Tris P-PA, hexamethoxymethyl compounds of Tris P-PA, and compounds having 1 to 5 methylol groups of hexamethylol compound of Tris P-PA substituted with methoxymethyl groups; and bishydroxymethyl naphtalnediol.

Examples of the hydroxyanthracene compound include 1,6-dihydroxymethyl-2,7-dihydroxyanthracene. Examples of the acyloxymethyl group-containing compound include methylol group-containing compounds in which a part or all the methylol groups are substituted with acyloxymethyl groups.

Preferable compounds among the compounds above include trimethylol phenol, bis hydroxymethyl-p-cresol, tetramethylol bisphenol A, and hexamethylol compounds of Tris P-PA (manufactured by Honshu Chemical Industry Co., Ltd.), or phenol compounds in which the methylol groups are substituted with the alkoxymethyl groups, and in which the methylol groups are substituted with both methylol groups and alkoxymethyl groups.

The compounds according to the (c) may be used alone, or as a combination thereof.

The total content of the thermosetting compound in the colored heat-curable composition in the invention is preferably 0.1 to 50% by weight, more preferably 0.2 to 40% by weight, and particularly 1 to 35% by weight, relative to the solid content (weight) of the colored heat-curable composition, although the content differs depending on the materials used.

—Various Kinds of Additives—

In the colored heat-curable composition in the invention, within a range that does not impair effects of the invention, if necessary, various additives such as a binder, a curing agent, a curing catalyst, a solvent, a filler, a polymer compound other than the above-mentioned one, a surfactant, an adherence enhancing agent, an antioxidant, an ultraviolet absorbing agent, an antiflocculant, a dispersant and the like can be added.

=Binder=

The binder is added in many cases when a pigment dispersion solution is prepared, does not necessitate the alkali solubility as long as the binder is soluble in an organic solvent.

The binders that are a linear organic polymer and soluble in an organic solvent are preferred.

Such linear organic polymers include polymers having carboxylic acids at the side chains. Examples of the polymer having carboxylic acids at the side chains include methacrylic acid copolymers, acrylic acid copolymers, itaconic acid copolymers, crotonic acid copolymers, maleic acid copolymers and partially esterified maleic acid copolymers as described in JP-A Nos. 59-44615, 59-53836 and 59-71048, and Japanese Patent Application Publication (JP-B) Nos. 54-34327, 58-12577 and 54-25957.

Otherwise, acidic cellulose derivatives having carboxylic acids at the side chains are preferable as the alkali-soluble binder.

Other preferable alkali-soluble binders include adducts of acid anhydrides to polymers having hydroxyl groups, polyhydroxystyrene resins, polysiloxane resins, poly(2-hydroxyethyl(meth)acrylate), polyvinyl pyrrolidone, polyethylene oxide and polyvinyl alcohol.

A Hydrophilic monomer may be copolymerized with the alkali-soluble binder. Examples of such monomer include alkoxyalkyl (meth)acrylate, hydroxyalkyl (meth)acrylate, glycerol (meth)acrylate, (meth)acrylamide, N-methylol acrylamide, secondary or tertiary alkyl acrylamide, dialkylaminoalkyl (meth)acrylate, morpholine (meth)acrylate, N-vinyl pyrrolidone, N-vinyl caprolactam, vinyl imidazole, vinyl triazole, methyl (meth)acrylate, ethyl (meth)acrylate, branched or linear propyl (meth)acrylate, branched or linear butyl (meth)acrylate, and phenoxyhydroxypropyl (meth)acrylate.

Among these binders, polyhydroxystyrene resins, polysiloxane resins, acrylic resins, acrylamide resins and acrylic/acrylamide copolymer resins are preferable, and acrylic resins, polyhydroxystyrene resins and polysiloxane resins are more preferable from the viewpoint of thermal resistance. The acrylic resins, acrylamide resins and acrylic/acrylamide copolymer resins are preferable from the viewpoint of development controlling ability.

Examples of the acrylic resin includes copolymers comprising the monomers selected from benzyl(meth)acrylate, (meth)acrylic acid, hydroxyethyl(meth)acrylate and (meth)acrylamide (for example, copolymers such as benzylmethacrylate/methacrylic acid copolymer, benzylmethacrylate/benzylmethacrylamide copolymer), and KS Resist 106 (manufactured by Osaka Organic Chemical Industry Ltd.), Cyclomer P series (manufactured by Daicel Chemical Industry Co.).

When the colorant is dispersed at a high concentration in the binder, the adhesiveness with a lower layer can be imparted, and these contribute to a coated surface state at the spin coat or slit coat.

The binder is preferably polymers having a weight-average molecular weight (measured by GPC and converted into polystyrene) of $1 \times 10^3$ to $2 \times 10^5$, more preferably polymer having the weight-average molecular weight of $2 \times 10^3$ to $1 \times 10^5$, and particularly polymer having the weight-average molecular weight of $5 \times 10^3$ to $5 \times 10^4$.

The content of the binder in the colored heat-curable composition in the invention is preferably 0.1 to 50% by weight, more preferably 0.2 to 40% by weight, and particularly preferably 1 to 35% by weight, based on the entire solid content in the colored heat-curable composition.

=Curing Agent=

In the invention, when an epoxy resin is used as the thermosetting compound, a curing agent is preferably added. Because there are many kinds of curing agents for epoxy resins and properties, a time during which a mixture of a resin and a curing agent can be used, the viscosity, curing temperature, curing time and heat generation are largely different depending on kinds of the curing agents, a curing agent has been selected depending on an intended purpose, use conditions and process conditions of the curing agent. As to the curing agent, the fifth chapter of "Epoxy Resin" (edited by H. Kakiuchi, published by Shokoudo) describes in detail.

Examples of the curing agents include catalytic curing agents such as tertiary amines and boron trifluoride-amine complexes, curing agents stoichiometrically reacting with functional groups of an epoxy resin such as polyamines and acid anhydrides, normal temperature-curing agents such as diethylenetriamine and polyamide resins, medium-temperature curing agents such as diethylaminopropylamine and tris(dimethylaminomethyl)phenol, and high temperature-curing agents such as phthalic anhydride and meta-phenylenediamine. The curing agents, when seen from the chemical structure, include amines containing polyamines such as diethylenetriamine, aromatic polyamines such as meta-phenylenediamine, tertiary amines such as tris(dimethylaminomethyl)phenol, acid anhydrides such as phthalic anhydride, polyamide resins, polysulfide resins and boron trifluoride-monoethylamine complexes, initial-stage condensates of synthetic resins such as phenol resins and dicyandiamides and the like.

The curing agent reacts, under heating, with an epoxy group to polymerize to raise the cross-linking density to cure. In order to reduce a film thickness, contents of the binder and the curing agent are preferably as small as possible, and in particular, the content of the curing agent is preferably 35 weight % or less, more preferably 30 weight % or less, and still more preferably 25 weight % or less, with respect to the thermosetting compound.

=Curing Catalyst=

In order to realize a high colorant concentration in the invention, in addition to the curing due to a reaction with the curing agent, a reaction mainly between epoxy groups is effective. Accordingly, in place of the curing agent, a curing catalyst can be used. An addition amount of the curing catalyst is, by weight, in the range of substantially $\frac{1}{10}$ to $\frac{1}{1000}$, preferably in the range of substantially $\frac{1}{20}$ to $\frac{1}{500}$, and more preferably in the range of $\frac{1}{30}$ to $\frac{1}{250}$, based on an epoxy resin of which epoxy equivalent is substantially 150 to 200. That is, only a slight amount thereof is effective to cure.

As specific examples of the curing catalysts, there are commercially available ones. For example, imidazole silane series "IS-1000", "IS-1000D", "IM-1000", "SP-1000", "IA-1000A", "IA-100P", "IA-100F", "IA-100AD", "IA-100FD", "IM-100F", "IS-3000" and "IS-4000" (trade name, manufactured by Japan Energy Co., Ltd.) and "1B2PZ" and "SFZ" (trade name, manufactured by Shikoku Chemical Corporation) are useful.

=Solvent=

A solvent may be used, if necessary, in the non-photosensitive colored heat-curable composition in the invention and be not fundamentally restricted particularly as long as it satisfies the solubility and coating property of the composition. A solvent is preferably selected in consideration of the solubility of a dye and a binder (alkali-soluble resin), the coating property and the safety.

Examples of the preferable solvent used for preparing the colored heat-curable composition include esters such as ethyl acetate, n-butyl acetate, isobutyl acetate, amyl formate, isoamyl acetate, butyl propionate, isopropyl butylate, ethyl butylate, butyl butylate, alkyl esters, methyl lactate, ethyl lactate, methyl oxylactate, ethyl oxylactate, butyl oxylactate, methyl methoxyacetate, ethyl methoxyacetate, butyl methoxyacetate, methyl ethoxyacetate, ethyl ethoxyacetate;

3-oxypropionic acid alkyl esters such as methyl 3-oxypropionate and ethyl 3-oxypropionate including methyl 3-methoxypropionate, ethyl 3-methoxypropionate, methyl 3-ethoxypropionate and ethyl 3-ethoxypropionate; 2-oxypropionic acid alkyl esters such as methyl 2-oxypropionate, ethyl 2-oxypropionate and propyl 2-oxypropionate including methyl 2-methoxypropyonate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, and ethyl 2-ethoxy-2-methylpropionate; methyl pyruvate, ethyl pyruvate, propyl pyruvate, methyl acetoacetate, ethyl acetoacetate, methyl 2-oxobutanate and ethyl 2-oxobutanate;

ethers such as diethyleneglycol dimethylether, tetrahydrofuran, ethyleneglycol monomethylether, ethyleneglycol monoethylether, methyl cellosolve acetate, ethyl cellosolve acetate, diethyleneglycol monomethylether, diethyleneglycol monoethylether, diethyleneglycol monobutylether, propyleneglycol methyl ether, propyleneglycol methylether acetate, propyleneglycol ethylether acetate, and propyleneglycol propylether acetate;

ketones such as methylethyl ketone, cyclohexanone, 2-heptanone and 3-heptanone; and aromatic hydrocarbons such as toluene and xylene.

Among them, methyl 3-ethoxypropionate, ethyl 3-ethoxypropionate, ethyl cellosolve acetate, ethyl lactate, diethyleneglycol dimethylether, butyl acetate, methyl 3-methoxypropionate, 2-heptanone, cyclohexanone, cyclopentanone, ethylcarbitol acetate, butylcarbitol acetate, propyleneglycol methylether and propyleneglycol methylether acetate are more preferable.

=Dispersant=

The dispersant can be added to improve the dispersibility of a pigment. As the dispersant, known ones can be appropriately selected and used. Examples of the dispersant include a cationic surfactant, a fluorine-based surfactant and a polymer surfactant.

Furthermore, a graft copolymer containing a particular acid amide group-containing monomer and a monomer remnant of quaternary ammonium salt in a main chain, which is described in JP-A No. 10-254133, has an excellent effect of slightly dispersing a pigment, and thereby can be used as the dispersant. When the graft copolymer is used, while reducing consumption of energy and time, the pigment can be finely dispersed and the dispersed pigment does not flocculate or precipitate with time and thereby can maintain dispersion stability over a long time.

The dispersants can be used by itself or in a combination of two or more thereof. An addition amount of the dispersant in the colored heat-curable composition in the invention is normally preferably in the range of substantially 0.1 to 50 parts by weight to 100 parts by weight of the pigment.

=Other Additives=

The non-photosensitive colored heat-curable composition in the invention, if necessary, can contain various kinds of additives such as filler, a polymer compound other than above-mentioned one, a surfactant, an adhesiveness promoter, an antioxidant, an ultraviolet absorbing agent, an antiflocculant, and the like.

Specific examples of the additives include fillers such as glass and alumina; polymer compounds other than the binding resins such as polyvinyl alcohol, polyacrylic acid, polyethyleneglycol monoalkylether and polyfluoroalkyl acrylate; surfactants such as nonionic, cationic and anionic surfactants; adherence enhancing agents such as vinyl trimethoxy silane, vinyl triethoxy silane, vinyl tris(2-methoxyethoxy)silane, N-(2-aminoethyl)-3-aminopropylmethylmetoxy silane, N-(2-aminoethyl)-3-aminopropyltrimethoxy silane, 3-aminopropyltriethoxy silane, 3-glycidoxypropyl trimethoxy silane, 3-glycidoxypropyl methyldimethoxy silane, 2-(3,4-epoxycyclohexyl)ethyl trimethoxy silane, 3-chloropropylmethyl dimethoxy silane, 3-chloropropyl trimethoxy silane, 3-methacryloxypropyl trimethoxy silane, and 3-mercaptopropyl trimethoxy silane; antioxidants such as 2,2-thiobis(4-methyl-6-t-butylphanol) and 2,6-di-t-butylphenol; ultraviolet absorbing agents such as 2-(3-t-butyl-5-methyl-2-hydroxydiphenyl)-5-chlorobenzotriazole and alkoxybenzophenone; and antiflocculants such as sodium polyacrylate.

Organic carboxylic acids, preferably low molecular weight organic carboxylic acids with a molecular weight of 1000 or less may be added for enhancing alkali solubility of non-cured parts to further improving development ability of the colored curable composition of the invention. Examples of the organic carboxylic acid include aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; aliphatic tricarboxylic acid such as tricarballylic acid, aconitic acid and camphoronic acid; aromatic monocarboxylic acid such as benzoic acid, toluic acid, cuminic acid, hemelitic acid and mesitylenic acid; aromatic polycarboxylic acid such as phthalic acid, isophthalic acid, terephthalic acid, trimellitic acid, trimesic acid, mellophanic acid and pyromellitic acid; and other carboxylic acid such as phenylacetic acid, hydroatropic acid, hydrocinnamic acid, mandelic acid, phenylsuccinic acid, atropic acid, cinnamic acid, methyl cinnamate, benzyl cinnamate, cinnamilydenic acid, cumalic acid and umbelic acid.

(Preparation Method of Colored Heat-Curable Composition)

A preferable preparation method of a colored heat-curable composition in the invention will be described. However, the invention is not restricted thereto.

As mentioned above, in the colored heat-curable composition in the invention, a method that uses a pigment of which particles are rendered finer and a particle size distribution is made sharper is preferred. Specifically, a method that uses a pigment that has an average particle diameter of substantially 0.01 μm and contains 75 weight % or more of pigment particles of which particle diameters are within 0.01±0.005 μm is preferably used.

In order to adjust a particle size distribution of the pigment in the foregoing range, a method of dispersing the pigment is particularly important. As such a dispersion method, a dispersion method that combines a dry dispersion process (kneading and dispersing process) that disperses in a high viscosity state with for example a kneader or a roll mill such as a two-roll mill and a wet dispersion process (micro-dispersing process) that disperses in a relatively low viscosity state with a three-roll mill or a bead mill can be cited.

Further, in the dispersion methods, it is preferred to co-disperse at least two kinds of pigments, to knead and disperse without a solvent or with a solvent as slight as possible or to use various kinds of dispersants. Furthermore, in order to alleviate the solvent shock, a resin component is preferably divided and added at the time of kneading and dispersing, and at the time of the micro-dispersing (divided in two). Furthermore, when the kneading and dispersing process transfer to the micro-dispersing process, in order to inhibit the pigment particles from reflocculating, a resin component excellent in the solubility is preferably used. Still furthermore, it is effective to use high hardness ceramics for beads of a bead mill or small size beads when the micro-dispersing is applied. As the resin component, for example, the above-mentioned alkali-soluble resin can be used.

In the invention, it is particularly preferred to use a colorant obtained in such a manner that at least two kinds of pigments are dispersed at a high viscosity state of 50000 mPa·s or more, and thereafter dispersed in a low viscosity state of 1000 mPa·s or less.

In general, the pigments, after synthesis, are dried by various methods and supplied. Usually, the pigment is dried from an aqueous medium and supplied as a powder body. When water is vaporized, a large evaporative latent heat is necessary, accordingly, large heat energy is necessary to dry to form powder. As the result, the pigment usually forms a flocculated body (secondary particle) of primary particles.

In a preparation method of a colored heat-curable composition in the invention, when a colorant is a pigment, in the beginning, kneading and dispersing is preferably carried out in such a manner that a binder is added to the pigment so that the viscosity after the kneading and dispersing may be relatively high viscosity of 50,000 mPa·s or more (preferably in the range of 50,000 to 100,000 mPa·s). Here, the kneading and dispersing may be high viscosity dispersion or dry dispersion.

In the next place, if necessary, the binder is additionally added to a dispersed substance after the kneading and micro-dispersing is carried out in such a manner that the viscosity after the micro-dispersing may be relatively low viscosity of 1000 mPa·s or less (preferably 100 mPa·s or less). The micro-dispersing may be low viscosity dispersion or wet dispersion.

In the kneading and dispersing, a ratio of a solvent is preferably in the range of 0 to 20 weight % to a substance being dispersed. When the dispersion is applied thus without using so much solvent, a surface of the pigment is forwarded in wetting with a constituent element mainly made of a resin component of a vehicle, and thereby an interface that a surface of the pigment particle forms can be converted from a solid/gas interface between the pigment particle and air to a solid/liquid interface between the pigment particle and a vehicle solution. When an interface that a surface of the pigment particle forms is converted from air to a solution, followed by mixing and agitating, the pigment can be dispersed to a fine state close to primary particles.

Thus, in order to highly disperse the pigment, it is effective to convert an interface that a surface of the pigment particle forms from air to solution. In such the conversion, strong shearing force or compression force is necessary. Accordingly, in the kneading and dispersing, it is preferable to use a kneader that can exert strong shearing force and compression force and to use a high viscous one as a substance being kneaded.

Further, when the micro-dispersing is applied, dispersion media of glass or ceramic fine particle are preferably used to mix and agitate. Furthermore, a ratio of a solvent in micro-dispersing is preferably in the range of 20 to 90 weight % to a substance being dispersed. In micro-dispersing, because it is necessary that the pigment particles are dispersed uniformly and stably to a fine state, it is preferable to use a disperser that can impart an impact force and a shearing force to flocculated pigment particles and to use a low viscous one as a substance being dispersed.

When the colorant is a dye, without necessitating the dispersion process above, it may be well dissolved in a certain solvent together with a binder.

A colored heat-curable composition in the invention can be prepared when a thermosetting compound such as an epoxy resin, a curing catalyst and a curing agent are added in thus obtained dispersed substance containing pigment or a solution of dye. Alternatively, when a binder is already a thermosetting compound, the colored heat-curable composition in the invention can be prepared when a curing catalyst and a curing agent are added to impart the thermosetting function, and if necessary a solvent is added.

A colored layer in the invention can be formed when forming a colored layer by coating the colored heat-curable composition on a support, followed by drying is carried out.

Specifically, for example, a colored heat-curable composition in the invention, which contains a solvent, is directly or through other layer coated on a support by a coating method such as a rotary coating method, a slit coating method, a flow casting method or a roll coating method, and thereby the colored layer is formed.

A specific thickness of a colored layer is in the range of 0.005 to 0.9 μm, preferably in the range of 0.01 to 0.7 μm and more preferably in the range of 0.02 to 0.65 μm.

In the invention, forming a colored layer preferably includes heating (it may be a post-baking process). Specifically, the colored layer can be formed when a colored heat-curable composition in the invention is coated on a support to form a coated film and thereafter heating is applied to thermally cure the coated film. The heating may be applied simultaneously with the drying after the coating, or, after the coating and drying, thermal curing may be separately applied. In the heating, known heating apparatus such as an oven or a hot plate is used preferably at a temperature in the range of 130 to 300° C., more preferably in the range of 150 to 280° C. and particularly preferably in the range of 170 to 260° C. and preferably for a time in the range of 10 sec to 3 hours, more preferably in the range of 30 sec to 2 hours and particularly preferably in the range of 60 sec to 60 min. However, if the production is considered, a time necessary for curing is preferred to be as short as possible.

(Colored Light-Curable Composition)

A colored light-curable composition used in the invention includes at least a colorant and a photocurable component. Among these, as the "photocurable component", a a photocurable composition usually used in the photolithography can be used, a composition containing at least a binder resin (alkali-soluble resin), a photosensitive polymerizing component (photopolymerizing monomer and the like) and a photopolymerization initiator can be used.

—Colorant—

The colorant same as a colorant described in the non-photosensitive colored heat-curable composition can be preferably used.

—Photocurable Component—

The "photocurable component" is a photocurable composition normally used in the photolithography and a composition containing a binder resin (alkali-soluble resin), a photosensitive polymerizing component (photopolymerizing monomer and the like) and a photopolymerization initiator can be used.

=Alkali-Soluble Resin=

As the binder resin, an alkali-soluble resin is preferred.

Among the alkali-soluble resin, in order to suppress a rate of change of a line width after development to an exposure intensity of the coated film at $7.5 \times 10^{-5}$ μm·m$^2$/J or less, an acrylic resin having a polyalkylene oxide chain and/or hydroxyethyl methacrylate (HEMA) in a molecule is preferred.

A weight-average molecular weight based on polystyrene of the acrylic resin is preferably in the range of 5,000 to 50,000, more preferably in the range of 6,000 to 30,000 and most preferably in the range of 8,000 to 20,000.

Further, a content of the polyalkylene oxide chains in a molecule is, by molar ratio, preferably in the range of 0.5 to 18 mole percent, more preferably in the range of 0.8 to 15 mole percent and most preferably in the range of 1 to 10 mole percent.

Among polyalkylene oxide chains, a polyethylene oxide chain is preferred and an addition mole number n ((EO)n) thereof is preferably in the range of 2 to 25, more preferably in the range of 2 to 15 and most preferably in the range of 5 to 12.

Furthermore, a content of the hydroxyethyl methacrylate in a molecule is, by molar ratio, preferably in the range of 10 to 30 mole percent and more preferably in the range of 15 to 25 mole percent.

The acrylic resins having a polyalkylene oxide chain in a molecule include, for example, alkali-soluble resins A below.

The alkali-soluble resin A is a copolymer copolymerized at least (i) at least one kind of acid component monomer selected from the group consisting of maleic acid anhydride (MAA), acrylic acid (AA), methacrylic acid (MA) and fumaric acid (FA), (ii) alkylpolyoxyethylene (meth)acrylate, and (iii) benzil (meth)acrylate.

In the alkali-soluble resin A, a molar ratio of the respective monomer components of (i) an acid component monomer, (ii)

alkylpolyoxyethylene (meth)acrylate (Acr(EO)$_n$: for example, CH$_3$(OC$_2$H$_4$)$_n$OCOC(R)=CH$_2$ (R=H, CH$_3$)), and (iii) benzil (meth)acrylate (BzMA) is preferably in the range of 15 to 30/1 to 20/50 to 84 and more preferably in the range of 17 to 25/2 to 15/60 to 80. Further, a weight-average molecular weight (Mw) based on polystyrene of the alkali-soluble resin A due to GPC is preferably in the range of 5,000 to 50,000 and more preferably in the range of 6,000 to 30,000.

(i) When a molar ratio of an acid component monomer is the lower limit value or more in the above range, the alkali solubility can be improved. Furthermore, when it is the upper limit value or less in the above range, the solubility in a solvent can be improved.

(ii) When a compositional weight ratio of alkylpolyoxyethylene (meth)acrylate (Acr(EO)$_n$: for example, CH$_3$(OC$_2$H$_4$)$_n$OCOC(R)=CH$_2$ (R=H, CH$_3$)) is the lower limit value or more in the above range, a colored light-curable composition coating solution can be sufficiently spread over a support, and thereby the invention tends to effectively achieved. Furthermore, when the compositional weight ratio is the upper limit value or less in the above range, the dispersibility of a colorant tends to be preferably improved.

(iii) When a compositional weight ratio of benzil (meth)acrylate (BzMA) is the lower limit value or more in the above range, the dispersion stability and the solubility of the colorant in a composition preferably tend to be improved. Furthermore, when the compositional weight ratio is the upper limit value or less, the alkali developability of a coated film is preferably improved.

A repetition number n of polyoxyethylene (EO)$_n$ of the (ii) alkylpolyoxyethylene (meth)acrylate (Acr(EO)$_n$: for example, CH$_3$(OC$_2$H$_4$)$_n$OCOC(R)=CH$_2$ (R=H, CH$_3$)) is in the range of 2 to 25, preferably in the range of 2 to 15 and particularly preferably in the range of 5 to 12. When the repetition number n is the lower limit value or more in the above range, after development with an alkali developer, generation of the development residue can be easily suppressed. Conversely, when the repetition number n is the upper limit value or less in the above range, the fluidity as a coating solution of a composition is improved, the generation of coating irregularity is suppressed, and the uniformity of a coated film thickness and the saving of the solution preferably tends to be improved.

The acrylic resin having hydroxyethyl methacrylate (HEMA) in a molecule includes one in which (ii) alkylpolyoxyethylene (meth)acrylate of the alkali-soluble resin A is replaced by hydroxyethyl methacrylate (HEMA).

The acrylic resin having a polyalkylene oxide chain and hydroxyethyl methacrylate (HEMA) in a molecule includes copolymer obtained by further copolymerizing hydroxyethyl methacrylate to an alkali-soluble resin A.

Further, a content of an alkali-soluble resin in a photocurable composition in the invention is preferably in the range of 0.5 to 15 weight % and more preferably in the range of 1.0 to 12 weight %. When the content of the alkali-soluble resin is 0.5 weight % or more, the development is promoted to result in a decrease in the production cost. Furthermore, when the content is 15 weight % or less, an excellent pattern profile can be obtained.

=Photosensitive Polymerizing Component=

A photosensitive polymerizing component used in the invention is generally a polymerizing monomer. The polymerizing monomer includes preferably compound having at least one addition polymerizable ethylenic unsaturated group and a boiling point of 100° C. or more under normal pressure. Examples of a photosensitive polymerizing component include mono-functional acrylates and methacrylates such as polyethylene glycol mono(meth)acrylate, polypropylene glycol mono(meth)acrylate and phenoxyethyl (meth)acrylate; (meth)acrylated compounds prepared after adding ethylene oxide or propylene oxide to polyfunctional alcohols such as polyethylene glycol di(meth)acrylate, trimethylolethane tri (meth)acrylate, neopentyl glycol di(meth)acrylate, pentaerythritol tri(meth)acrylate, pentaerythritol tetra(meth) acrylate, dipentaerythritol penta(meth)acrylate, dipentaerythritol hexa(meth)acrylate, hexanediol (meth) acrylate, trimethylolpropane tris(acryloyloxypropyl)ether, tris(acryloyloxyethyl)isocyanulate, glycerine and trimethylolethane; urethane acrylates described in JP-B Nos. 48-41708 and 50-6034, and JP-A No. 51-37193; polyester acrylates described in JP-A No. 48-64183 and JP-B Nos. 49-43191 and 52-30490; polyfunctional acrylates and methacrylates of epoxyacrylate as a reaction product of an epoxy resin and (meth)acrylic acid; and mixtures thereof.

Further, examples of the monomers include the compounds described in Nihon Secchaku Kyokai-shi Vol. 20, No. 7, pp. 300-308 as photocurable monomers and oligomers.

The polymerizable monomer preferably includes a polyalkyleneoxide chain in a molecule because a rate of change of a line width after development to exposure intensity of the coated film can be suppressed to $7.5 \times 10^{-5}$ μm·m$^2$/J or less. As such the polymerizable monomers are shown below.

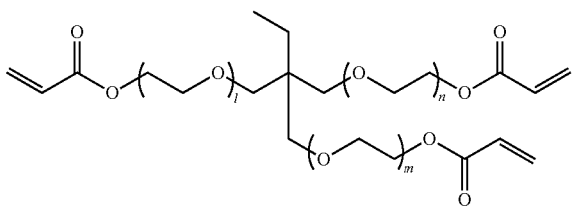

EO = l + m + n = 6

NK ESTER A-TMP-6EO (Shin-Nakamura Chemical Co., Ltd.)

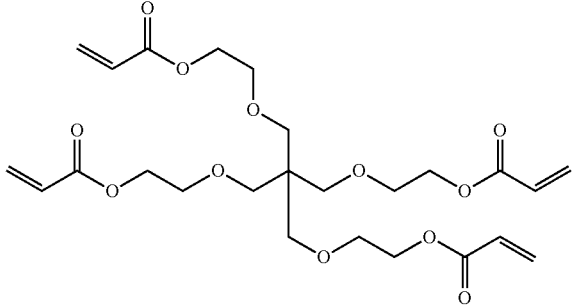

KAYARAD RP-1040 (Nippon Kayaku Co., Ltd.)

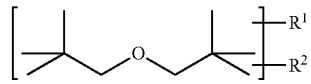

KAYARAD DPCA-30 (Nippon Kayaku CO., Ltd.)

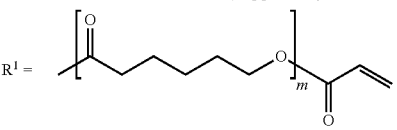

m:1, R$^1$:3, R$^2$:3

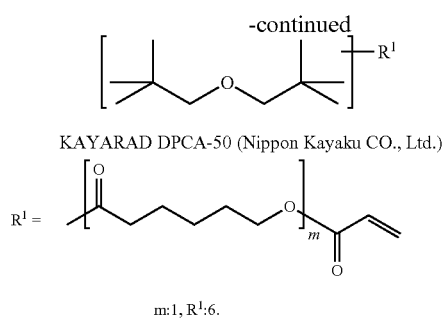

KAYARAD DPCA-50 (Nippon Kayaku CO., Ltd.)

m:1, R¹:6.

A content of the polymerizable monomer in the photocurable composition is preferably in the range of 0.1 to 90 weight %, more preferably in the range of 1.0 to 80 weight % and particularly preferably in the range of 2.0 to 70 weight %, based on a solid content of the photocurable composition.

=Photopolymerization Initiator=

The photopolymerization initiator is not restricted particularly as long as it can polymerize the polymerizable monomer (and possibly the alkali-soluble resin). However, from the viewpoints of the polymerization characteristics, initiation efficiency, absorption wavelength, availability and cost, the photopolymerization initiator preferably contains at least one kind of compound selected from a group consisting of halomethyl-s-triazine-based compounds, oxime-based compounds and α-aminoketone-based compounds.

Examples of the photopolymerization initiators of halomethyl-s-triazine based compound include vinyl-halomethyl-s-triazine compounds described in JP-B No. 59-1281, and 2-(naphto-1-yl)-4,6-bis-halomethyl-s-triazine compound and 4-(p-aminophenyl)-2,6-bis-halomethyl-s-triazine compound described in JP-A No. 53-133428.

In addition, TAZ-series such as TAZ-107, TAZ-110, TAZ-104, TAZ-109, TAZ-140, TAZ-204, TAZ-113 and TAZ-123 (trade name, manufactured by Midori Kagaku Co., Ltd.) can be cited.

Examples of the photopolymerization initiators of the α-aminoketone based compounds include Irgacure series such as Irgacure 907 and Irgacure 369 (trade name, manufactured by Ciba Specialty Chemicals Co.), 2-methyl-1-phenyl-2-morpholinopropane-1-one, 2-methyl-1-[4-(hexyl)phenyl]-2-morpholinopropane-1-one and 2-ethyl-2-dimethylamino-1-(4-morpholinophenyl)-butanone-1.

Examples of photopolymerization initiators of the oxime based compound, without particularly restricting, include 1-[4-(phenylthio)phenyl]-1,2-octanedione-2-(O-benzoyloxime), 1-(4-methylsulfanylphenyl)-1,2-butanedione-2-(O-acetyloxime), 1-(4-methylsulfanylphenyl)-1-butanone-O-acetyloxime, hydroxyimino-(4-methylsulfanylphenyl)-ethyl acetate ester-O-acetate and hydroxyimino-(4-methylsulfanylphenyl)-ethyl acetate ester-O-benzoate.

The photopolymerization initiators can be used together with a sensitizer and a light stabilizer.

Specific examples thereof include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acrydone, 10-butyl-2-chloroacrydone, benzyl, dibenzalacetone, p-(dimethylamino)phenylstyrylketone, p-(dimethylamino)phenyl-p-methylstyrylketone, benzophenone, p-(dimethylamino)benzophenone (or Michler's ketone), p-(diethylamino)benzophenone, benzoanthrone, and benzothiazole compounds, Tinuvin 1130 and Tinuvin 400 described in JP-B No. 51-48516.

In the invention, in addition to the photopolymerization initiators above, other known photopolymerization initiators can be used.

Examples of them include vicinal polyketolaldonyl compounds described in U.S. Pat. No. 2,367,660, -carbonyl compounds described in U.S. Pat. Nos. 2,367,661 and 2,367,670, acyloin ether compounds described in U.S. Pat. No. 2,448,828, aromatic acyloin compounds substituted with -carbohydrates described in U.S. Pat. No. 2,722,512, polynuclear quinone compounds described in U.S. Pat. Nos. 3,046,127 and 2,951,758, combinations of trially imidazole dimer and p-aminophenyl ketone described in U.S. Pat. No. 3,549,367, and bemzothiazole compounds/trihalomethyl-s-triazine compounds described in JP-B No. 51-48516.

The photopolymerization initiator includes at least one of an active halogen compound selected from halomethyl oxadiazole compounds and halomethyl-s-triazine compounds, a 3-aryl substituted coumarin compound, a rofin dimmer, a benzophenone compound, an acetophenone compound and derivatives thereof, cyclopentadiene-benzene-iron complex and salt thereof, and an oxime-based compound, and the like.

The active halogen compound such as halomethyl oxadiazol described above includes 2-halomethyl-5-vinyl-1,3,4-oxadiazole compound, and that like. described in JP-B No. 57-6096, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole, and the like.

Furthermore, as the photopolymerization initiator, T series (trade name, manufactured by PANCHIM, Ltd.) can be effectively used. Examples thereof include T-OMS, T-BMP, T-R and T-B (trade name).

Still furthermore, as the photopolymerization initiators, Irgacure series (trade name, manufactured by Ciba Specialty Chemicals Co.) can be also effectively used. Examples thereof include Irgacure 651, Irgacure 500, Irgacure 1000, Irgacure 149, Irgacure 819, Irgacure 261, as the Irgacure series, Darocure 1173 and the like as the Darocure series.

Further, as the photopolymerization initiator, 4,4'-bis(diethylamino)-benzophenone, 2-benzyl-2-dimethylamino-4-morpholinobutyrophenone, 2,2-dimethoxy-2-phenylacetophenone, 2-(o-chlorophenyl)-4,5-diphenyl imidazolyl dimer, 2-(o-fluorophenyl)-4,5-diphenyl imidazolyl dimer, 2-(o-methoxyphenyl)-4,5-diphenyl imidazolyl dimer, 2-(p-methoxyphenyl)-4,5-diphenyl imidazolyl dimer, 2-(p-dimethoxyphenyl)-4,5-diphenyl imidazolyl dimer, 2-(2,4-dimethoxyphenyl)-4,5-diphenyl imidazolyl dimer, 2-(p-methylmercaptophenyl)-4,5-diphenyl imidazolyl dimer, and benzoin isopropyl ether can also be used usefully.

A amount of the photopolymerization initiator in the invention is preferably in the range of 0.01 to 50 weight %, more preferably in the range of 1 to 30 weight % and particularly preferably in the range of 1 to 20 weight %, based on a solid content of the polymerizing monomer. When the amount of the photopolymerization initiator is set at 0.01 weight % or more, a polymerization reaction tends to readily proceed. Furthermore, when it is set at 50 weight % or less, though the polymerization rate becomes small, a molecular weight becomes larger to strengthen the film strength.

A heat polymerization inhibitor is preferably added on addition to the additives above, and preferable examples thereof include hydroquinone, p-methoxyphenol, di-t-butyl-p-cresol, pyrogallol, t-butylcatechol, benzoquinone, 4,4'- thiobis(3-methyl-6-t-butylphenol), 2,2'-methylenebis(4-methyl-6-t-butylphenol) and 2-mercaptobenzimidazole.

=Solvent=

The colored photocurable composition in the invention can be used as a solution dissolved in various kinds of solvents. The respective solvents used in the colored photocurable compositions in the invention, as long as these satisfy the solubility of the respective components and the coating properties of the colored photocurable compositions, are not particularly restricted.

Specifically, ones same as that described in the colored heat-curable compositions can be preferably used.

=Other Additives=

In the colored photocurable composition of the invention, as necessary, various kinds of additives can be further added. As specific examples of the various kinds of additives, the various kinds of additives described in the non-photosensitive colored heat-curable compositions can be cited.

Forming a colored layer in the invention can include: forming a coated film by coating the colored photocurable composition directly or through another layer on a support followed by drying (forming a coated film); exposing the coated film (exposing); developing the exposed coated film with an alkali developer (developing); and heating the coated film that has been exposed and developed (post-baking).

In the forming a coated film, a colored photocurable composition is coated on a support by means of a coating method such as a rotary coating method, flow casting method, roll coating method or a slit coating method and dried, and thereby a radiation-sensitive composition layer (coated layer) can be formed.

In the developing, radiation is irradiated to a coated film formed in the forming a coated film to photocure the coated film. For example, through a mask, a particular pattern is exposed. As radiation used at the exposing, in particular, UV light such as g-ray, h-ray and i-ray can be preferably used.

In the post-baking, in order to sufficiently cure an exposed coated film, a heating process can be applied. A heating temperature in the heating is preferably in the range of 100 to 300° C. and more preferably in the range of 150 to 250° C. Furthermore, a heating time is preferably in the range of substantially 10 min to 1 hr and more preferably in the range of substantially 5 to 30 min.

[Forming Photoresist Layer]

A production method for a color filter of the invention includes (b) forming a photoresist layer on the first colored layer.

As mentioned above, after a colored layer is formed on a support in the (a), a photoresist layer (photosensitive resin layer) is formed on the colored layer formed in the (a). Specifically, a positive or negative working photosensitive resin composition is coated on the colored layer and dried to form a photoresist layer. When a photoresist layer of the invention is formed, a pre-baking process is preferred to further apply.

As the positive working photosensitive resin composition, a positive working resist composition suitable for a positive working photoresist that is sensitive to radiations such as UV-rays (g-ray, i-ray), far UV-rays including excimer laser, electron beam, ion beam and X-rays can be used. Among the radiations, as one that exposes the photosensitive resin layer, from an object of the invention, the g-ray and i-ray are preferred, and in particular, the i-ray exposure is preferred.

Specifically, as the positive working photosensitive resin composition, a composition containing a quinone diazide compound and an alkali-soluble resin is preferred. In the positive working photosensitive resin composition containing a quinone diazide compound and an alkali-soluble resin, under irradiation of light having a wavelength of 500 nm or less, a quinone diazide group is decomposed to generate a carboxyl group and to result in an alkali-soluble state from an alkali-insoluble state. By making use of the phenomenon, the positive working photosensitive resin composition containing a quinone diazide compound and an alkali-soluble resin is used as a positive photoresist. The positive working photoresist, being very excellent in the resolving power, is used to prepare integrated circuits such as ICs and LSIs. The quinone diazide compound has a naphthoquinone diazide compound.

In recent years, since, with an improvement in a degree of integration of integrated circuits, a wiring width is miniaturized, in the etching process, in place of the existing wet etching process, a dry etching process is becoming a mainstream. In the dry etching process, a shape of the resist is reflected as it is on a shape of a layer to be etched; accordingly, when a shape of the resist is poor, a area that is not necessarily etched is etched as well, and thereby defects of integrated circuits and yield deterioration thereof are caused. Accordingly, a resist less in the development residue (scum) and excellent in the profile is in demand more than ever. Furthermore, in the dry etching process, in some cases, a temperature of the support goes up to cause the thermal deformation of the resist pattern to deteriorate the dimensional accuracy. Accordingly, the heat resistance of the resist is in demand more than ever. When existing positive photoresists are seen from such the viewpoints, many positive photoresists that satisfy the profile, scum, resolving power and heat resistance can be commercially availed. For example, FH-6000 series such as FH-6400L and FH-6800L (trade name, manufactured by Fuji Film Electronics Materials Co., Ltd.), FHi-series such as FHi-3200 and FHi-3950 (trade name, manufactured by Fuji Film Electronics Materials Co., Ltd.), FHi-600 series such as FHi-644 and FHi-645 (trade name, manufactured by Fuji Film Electronics Materials Co., Ltd.), and Fi-SP series such as Fi-SP2 (trade name, manufactured by Fuji Film Electronics Materials Co., Ltd.) can be cited.

However, without restricting thereto, as far as one can form a mask shape preferable for pattern formation, irrespective of commercial availability, the one can be used as a positive photosensitive resin composition.

As the negative photosensitive resin composition, negative photoresist compositions sensitive to radiation rays such as UV-rays (g-ray, i-ray), far-UV rays, X-rays, electron beams, molecular beams, γ-rays and synchrotron radiations can be cited. In more detail, a negative photoresist composition that is excellent in the resolving power and sensitivity and does not substantially generate micro-defects due to the development residue is preferred. The negative photoresist of the invention is coated on a colored layer by means of a spin coating method or a roller coating method at a thickness in the range of, for example, 0.5 to 3 μm. Thereafter, by heating, drying, printing a circuit pattern by illuminating UV-rays through an exposure mask and developing as necessary after heating after the exposure (PEB), a negative image can be obtained. Furthermore, when an etching process is applied with the image as a mask, a thermosetting resin layer can be processed patternwise. Typical application fields include production processes of semiconductors such as ICs, production processes of circuit boards such as liquid crystals and thermal heads, and other photo-application processes. Furthermore, by making use of difference of affinities of the image and a support to ink, the negative photosensitive resin composition can be applied as well to a planographic printing plate. With an increase in the integration degree in the processing of a semiconductor substrate, higher resolving power of the photoresist is in demand.

The negative photosensitive resin layer preferably contains a photopolymerization initiator and a polymerizing compound having an ethylenic unsaturated bond. Of negative photosensitive resin compositions that are used in such photosensitive resin layers, precedent arts as shown below are known. For example, JP-B No. 54-23574 discloses a technology where, in combination with a photo-acid generator made of an organic halide, a novolac resin is photo-cured. Furthermore, West Germany Patent Unexamined Publication No. 2057473 discloses that, as a binder between a photo-acid generator made of a diazo compound and a photocurable composition made of methyloled melamine, a phenolic resin such as a novolac resin can be applied. Still furthermore, JP-A No. 60-263143 discloses a composition made of a photo-acid generator, an acid-curable aminoblast resin such as a melamine resin and a general novolac resin and says that a negative image that can be developed with water and is high in the thermal stability can be obtained. Furthermore, JP-A No. 62-164045 discloses that an organic halide having light absorption in the far-ultraviolet range can be advantageously used as the photo-acid generator in such a composition. Similarly, JP-A No. 2-52348 discloses that an organic halide having a pKa value in a particular range is advantageous as the photo-acid generator in a similar system. Still furthermore, JP-A No. 2-154266 discloses that an oxime sulfonic acid ester is advantageous as the photo-acid generator in a similar photo-curable composition. As still another example, JP-A No. 2-146044 discloses that a composition that combines a photo-acid generator containing a particular trichlorotriazine group and a novolak resin containing m-cresol at 30% or more in an alkoxylated melamine is useful for high-energy ray exposure. Furthermore, EP Patent No. 397460A discloses that a highly branched novolak resin can be used in a similar composition. Such negative photosensitive resin compositions are commercially available, and examples thereof include SC series products such as "SC-60" and "SC-450" (trade name, manufactured by Fuji Film Electronic Materials Co., Ltd.); HR series products such as "HR-100" and "HR-200" (trade name, manufactured by Fuji Film Electronic Materials Co., Ltd.); and HNR series products such as "HNR-80" and "HNR-120" (trade name, manufactured by Fuji Film Electronic Materials Co., Ltd.). However, without restricting thereto, as far as a mask shape suitable for patterning may be formed, irrespective of commercial availability, the negative photosensitive resin compositions can be used.

When the photosensitive working resin is coated, above-mentioned coating methods can be preferably applied.

A specific thickness of the photosensitive resin layer is preferably in the range of 0.01 to 3 μm, more preferably in the range of 0.1 to 2.5 μm, and still more preferably in the range of 0.15 to 2 μm.

[Forming Image]

A production method for a color filter of the invention includes (c) forming an image on the first colored layer by removing the photoresist layer in the form of an image pattern. Here, the colored layer may be constituted of a single colored layer or at least two kinds of colored layers.

In the forming an image, the photoresist layer is exposed patternwise corresponding to an area on a support for forming a colored layer (hereinafter, appropriately, referred to as "second colored layer") that is different from the first colored layer formed in the (a) forming a first colored layer, followed by developing, and thereby a mask for dry etching (pattern image) can be formed.

In the invention, a pattern formed by removing the photoresist layer of an area on the support on which the second colored layer is formed is formed on the first colored layer formed in the (a). Thereby, a surface (a surface on a side opposite to a side that faces a support) of the colored layer formed patternwise in the (a) is exposed. On the other hand, an area other than an area on a support on which the second colored layer is formed in a surface of the first colored layer formed in the (a) is covered with a photoresist layer.

In a color filter produced according to a production method of the invention, when the second colored layer is formed on the support, in addition to pixels constituted by the first colored layer formed in the (a), one more kind of pixels can be formed. Since the photoresist layer that is a mask material can be fine and has the rectangularity, the respective pixels of the color filter produced by a production method of the invention can be formed fine and rectangular.

The exposing a photoresist layer can be applied when g-ray, h-ray or i-ray, preferably the i-ray is irradiated through a predetermined (image-wise) mask pattern to a positive or negative working photosensitive resin composition.

The photoresist of an area where the second colored layer is being formed owing to the exposure is developed and removed by use of a developing solution described below to form a second colored layer on an area other than the colored layer already disposed on the support.

As the developing solution, as long as it does not affect on a colored layer containing a colorant and can dissolve an exposed area of the positive working resist and an uncured area of the negative working resist, any one thereof can be used. Specifically, a combination of various kinds of organic solvents and an alkaline aqueous solution can be used.

As the alkaline aqueous solutions, an alkaline aqueous solution obtained by dissolving an alkaline compound such as sodium hydroxide, potassium hydroxide, sodium carbonate, sodium silicate, sodium meta silicate, aqueous ammonia, ethylamine, diethylamine, dimethylethanolamine, tetramethylammonium hydroxide, tetraethylammonium hydroxide, choline, pyrrole, piperidine or 1,8-diazabicyclo-[5.4.0]-7-undecene at a concentration in the range of 0.001 to 10 weight % and preferably in the range of 0.01 to 1 weight % can be preferably used. When a developing solution consisted of such an alkaline aqueous solution is used, in general, after the development, water is used to cleanse.

[Etching]

A production method for a color filter of the invention includes (d) etching the first colored layer in the form of the image formed in the forming the image by use of a dry etching process that uses a mixed gas in which a fluorine-based gas and oxygen ($O_2$) are mixed at a mixing ratio (fluorine-based gas/$O_2$), by flow rate ratio, in the range of from 2/1 to 8/1.

A first colored layer of an area exposed in the form of the image corresponding to an area on a support on which a second colored layer being formed in the (c) forming an image is etched by a dry etching process. Typical examples of the dry etching processes include processes described in JP-A Nos. 59-126506, 59-46628, 58-9108, 58-2809, 57-148706 and 61-41102.

As mentioned above, according to the forming an image, of the first colored layer formed in the (a), only an area corresponding to an area on a support on which a second colored layer is formed is exposed. In this state, an exposed colored layer is anisotropically etched by a dry etching process (for example, plasma etching) that uses a mixed gas in which a fluorine-based gas and oxygen are mixed at a mixing ratio (fluorine-based gas/$O_2$) in the range of 2/1 to 8/1 by flow rate ratio, and thereby the colored layer formed in the (a) can be removed in the forming the image formed in the (c) forming an image. When the etching gas is used, the photoresist layer described below can be easily removed.

In what follows, a fluorine-based gas in the invention, a mixing ratio of the fluorine-based gas and oxygen, other gases that may be mixed and internal pressure of a chamber where the dry etching is carried out will be detailed.

A mixed gas that is used in the (d) etching in the invention contains a fluorine-based gas and $O_2$ from the viewpoint of a film being etched being an organic material.

In the invention, as the fluorine-based gas, known gases can be used. However, a gas represented by a formula (I) below is preferred.

$$C_nH_mF_l \qquad \text{Formula (I)}$$

[In the formula, n represents an integer from 1 to 6, m represents an integer from 0 to 13 and l represents an integer from 1 to 14.]

The fluorine-based gas represented by the formula (I) is preferred to arbitrarily select from a group consisting of $CF_4$, $C_2F_6$, $C_3F_8$, $C_2F_4$, $C_4F_8$, $C_4F_6$, $C_5F_8$ and $CHF_3$ and use. Among these, the fluorine-based gas can be preferably selected from a group consisting of $CF_4$, $C_2F_6$, $C_4F_8$ and $CHF_3$ arbitrarily, more preferably the fluorine-based gas can be arbitrarily selected from a group consisting of $CF_4$ and $C_2F_6$, and $CF_4$ is particularly preferred.

Furthermore, the fluorine-based gas in the invention may contain one kind of gas selected from the above group or may contain at least two kinds thereof.

In a mixed gas in the invention, a mixing ratio of a fluorine-based gas and $O_2$ is set in the range of 2/1 to 8/1 by flow rate ratio. When the mixing ratio is set in the above range, during the etching, because adhesion of an etching product on a sidewall area of a photoresist layer is suppressed, in removing a photoresist layer described below, the resist can be readily peeled. In particular, from the viewpoint of, while maintaining the rectangularity of a layer being etched, suppressing adhesion of an etching product on a sidewall area of a photoresist layer, the mixing ratio is preferably in the range of 2/1 to 6/1 and particularly preferably in the range of 3/1 to 5/1.

In the mixed gas in the invention, from the viewpoints of maintaining the control stability of partial pressure of etching plasma and the verticality of an etched shape, in addition to the fluorine-based gas and $O_2$, one selected arbitrarily from rare gases such as helium (He), neon (Ne), argon (Ar), krypton (Kr) and xenon (Xe) can be preferably further mixed. In the invention, among the foregoing rare gases, from a reason same as mentioned above, at least one kind arbitrarily selected from a group consisting of Ar, He, Kr, $N_2$ and Xe can be preferably mixed, and one kind arbitrarily selected from a group consisting of He, Ar and Xe can be more preferably mixed. However, when a mixed gas is made of only a fluorine-based gas and $O_2$ and the control stability of partial pressure of etching plasma and the verticality of a shape being etched can be maintained, the gas may not be mixed.

Furthermore, as a gas that may be mixed, one kind of gas can be selected from the above group and at least two kinds thereof may be contained in the mixed gas.

A mixing ratio of other gas that may be mixed is preferably more than zero and 25 or less with $O_2$ set at 1 by flow rate ratio, more preferably 10 or more and 20 or less and particularly preferably 16.

(Internal Pressure of Chamber where Dry Etching is Carried Out)

In the (d) etching in the invention, the internal pressure of a chamber where the dry etching is carried out is preferably in the range of 2.0 to 6.0 Pa and more preferably in the range of 4 to 5 Pa.

Under the conditions where the mixing ratio of mixed gas and the internal pressure of a chamber are satisfied, an etching product does not adhere to a sidewall area of a photoresist layer and the photoresist can be easily peeled.

The dry etching conditions in the invention are different depending on a material and a layer thickness of the colored layer. Other than the foregoing conditions, preferable conditions in the invention will be described below.

A gas flow rate of the mixed gas in the invention is preferably 1000 sccm or less and more preferably 500 sccm or less.

A high frequency can be selected from 400 kHz, 60 MHz, 13.56 MHz and 2.45 GHz, and a RF power in the range of 50 to 2000 W and preferably in the range of 100 to 1000 W can be used.

As an etching time, the etching of one color is preferably carried out within 5 min and more preferably within 3 min.

In the invention, in order to avoid etching a lower layer due to over-etching and damage, an endpoint detector is used to manage. Thereby, in both when a support surface is $Si_3N_4$ that is a passivation film or when a support is a visibly transparent curable resin, an etching amount of a support due to the etching process can be suppressed.

[Removing Photoresist Layer]

A production method for a color filter in the invention includes (e) removing the photoresist layer remaining after the etching. When the etching gas is used to etch, without adhesion of an etching product on a sidewall area of a photoresist layer, a photoresist layer can be easily peeled with a peeling agent described below.

The removing a photoresist layer in the invention preferably includes (1) giving a peeling solution or a solvent on a photoresist layer to make a photoresist layer removable and (2) removing the photoresist layer by washing with cleaning water.

As the giving a peeling solution or a solvent on a photoresist layer to make a photoresist layer removable, a paddle developing process where for example a peeling solution or a solvent is gave on at least a photoresist layer to stay there for a predetermined time can be cited. A staying time of the peeling solution or solvent is preferably in the range of several tens seconds to several minutes without particularly restricting.

Furthermore, as the removing the photoresist layer with cleaning water, removing the photoresist layer by spraying cleaning water from, for example, a spray type or shower type injection nozzle to the photoresist layer can be cited.

As cleaning water, pure water is preferably used.

Furthermore, as the injection nozzle, an injection nozzle that includes an entirety of a support within an injection range and an injection nozzle that is a movable injection nozzle and of which movable range includes an entirety of a support can be cited. In the case of a movable injection nozzle, when, in the course of removing the photoresist layer, cleaning water is injected while moving the injection nozzle from a center area of the support to an end area of the support twice or more, more effectively the photoresist layer can be removed.

After finishing the etching, the photoresist having a function as a mask (exposed photosensitive resin layer) is removed by use of a peeling solution.

The peeling solution generally contains an organic solvent. However, it may further contain an inorganic solvent. The organic solvent includes, for example, 1) hydrocarbon-based compounds, 2) halogenated hydrocarbon-based compounds, 3) alcoholic compounds, 4) ether or acetal-based compounds, 5) ketone or aldehyde-based compounds, 6) ester-based compounds, 7) polyvalent alcohol-based compounds, 8) carboxylic acid or acid anhydride thereof based compounds, 9) phenolic compounds, 10) nitrogen-containing compounds, 11) sulfur-containing compounds and 12) fluorine-containing compounds.

As the peeling solution in the invention, a nitrogen-containing compound is preferably contained and a non-cyclic nitrogen-containing compound and a cyclic nitrogen-containing compound are more preferably contained.

The non-cyclic nitrogen-containing compound is preferably a non-cyclic nitrogen-containing compound having a hydroxy group. Specific examples include monoisopropanolamine, diisopropanolamine, triisopropanolamine, N-ethylethanolamine, N,N-dibutylethanolamine, N-butylethanolamine, monoethanolamine, diethanolamine and triethanolamine. Monoethanolamine, diethanolamine and triethanolamine are preferred and monoethanolamine ($H_2NCH_2CH_2OH$) is more preferred.

Examples of the cyclic nitrogen-containing compounds include isoquinoline, imidazole, N-ethylmorpholine, ε-caprolactone, quinoline, 1,3-dimethyl-2-imidazolidinone, α-picoline, β-picoline, γ-picoline, 2-pipecoline, 3-pipecoline, 4-pipecoline, piperadine, piperidine, pyrazine, pyridine, pyrollidine, N-methyl-2-pyrollidone, N-phenyl morpholine, 2,4-lutidine and 2,6-lutidine. Among these, N-methyl-2-pyrollidone and N-ethyl morpholine are preferred and N-methyl-2-pyrollidone (NMP) is more preferred.

The peeling solution in the invention preferably contains a non-cyclic nitrogen-containing compound and a cyclic nitrogen-containing compound. Among these, as the non-cyclic nitrogen-containing compound, at least one kind selected from monoethanolamine, diethanolamine and triethanolamine is preferably contained and, as the cyclic nitrogen-containing compound, at least one kind selected from N-methyl-2-pyrollidone and N-ethyl morpholine is preferably contained, monoethanolamine and N-methyl-2-pyrollidone being more preferably contained.

When the peeling solution is used to remove, a photoresist formed on an upper area of a color filter layer may be removed. Even when a deposited matter that is an etching product adhered on a sidewall area of a photoresist layer, the deposited matter may be not completely removed. Here, the deposited matter expresses one formed by adhering and depositing the etching product on a sidewall area of the colored layer.

A content of the non-cyclic nitrogen-containing compound is preferably 9 parts by weight or more and 11 parts by weight or less, based on 100 parts by weight of the peeling solution and a content of the cyclic nitrogen-containing compound is preferably 65 parts by weight or more and 70 parts by weight or less.

Furthermore, the peeling solution in the invention is preferably obtained by diluting a mixture of a non-cyclic nitrogen-containing compound and a cyclic nitrogen-containing compound with pure water.

[Forming Second Colored Layer]

A production method for a color filter of the invention preferably includes, after the (e) removing the photoresist layer, (f) forming a second colored layer that is different from the first colored layer formed in the (a) at least on the area from which the first colored layer formed in the (a) (an area on a support where a second colored layer is formed) is removed.

Here, the second colored layer preferably contains at least a colorant different from the colorant contained in the first colored layer formed in the (a).

In the forming a second colored layer in the invention, at least a colored photocurable composition or a colored heat-curable composition is imparted at least on an area from which the first colored layer formed in the (a) is removed to form a second colored layer. In particular, forming a second colored layer by imparting a colored heat-curable composition at least on an area from which a first colored layer formed in the (a) is removed is preferably disposed.

In the invention, the colored heat-curable composition can be imparted not only on an area from which a first colored layer formed in the (a) is removed but also on an area thereon the first colored layer formed in the (a) remains. Thereby, on an area from which the first colored layer formed in the (a) is removed, the colored heat-curable composition can be more assuredly imparted.

In a production method for a color filter of the invention, as mentioned above, at least a second and subsequent colored layers are formed by embedding a curable composition containing a colorant in a recess formed in an already formed colored layer.

As to the colored photocurable composition and colored heat-curable composition, ones described in the forming a first colored layer formed in the (a) can be preferably applied.

A method of imparting the colored heat-curable composition, a colored heat-curable composition is preferably method coated and imparted on an area from which the first colored layer formed in the (a) is removed. Of a method of coating a colored heat-curable composition, the coating method and coating conditions mentioned above can be applied.

When the colored heat-curable composition imparted on an area from which the first colored layer formed in the (a) is removed is cured by the above-mentioned post-baking process, a second colored layer is different from the first colored layer formed in the (a) can be formed.

As the colored heat-curable composition, above-mentioned colored heat-curable compositions can be used. However, when the colored layer formed in the (a) is formed with a colored heat-curable composition, one at least containing a colorant different from a colorant contained in a colored layer formed in the (a) is preferred.

Furthermore, when a colored layer formed in the (a) is formed with a colored photocurable composition, the colored heat-curable composition is preferably a colored heat-curable composition at least containing a colorant different from a colorant contained in the colored photocurable composition.

A production method of the invention of a color filter preferably includes a continuous process group made of the (b) forming a photoresist layer, (c) forming an image, (d) etching, (e) removing the photoresist layer and (f) forming a second colored layer by at least two groups.

When the process group is applied once more, one kind of a colored layer (for example, a color other than the two colors) different from already formed two kinds (for example, two colors) of the colored layers can be formed. Accordingly, in the invention, since two process groups are contained, a color filter made of three kinds (for example, three colors) of colored layers can be produced.

A production method of the invention of a color filter preferably further includes removing a colored layer laminated on a colored layer on a lower layer side (a side close to a support) of at least two colored layers laminated and formed on a support.

In the invention, when the second colored layer is formed on both of a support from which a colored layer formed in the (a) is removed and a colored layer formed in the (a), a second colored layer laminated and formed on a colored layer formed in the (a) is preferably removed. Thereby, the color purity of pixels made of a colored layer formed in the (a) can be heightened. Furthermore, when in the invention a third colored layer is further formed, the second and third colored layers laminated and formed on the colored layer formed in the (a) and a third colored layer laminated and formed on the second colored layer are preferably removed. Thereby, the color purity of pixels made of the colored layer formed in the (a) and the second colored layer can be made higher.

As a method of removing a colored layer laminated and formed on a colored layer, an etch-back process and a CMP process can be cited. In the etch-back process, a photoresist layer may be formed on a colored layer or may not be formed.

When a colored layer laminated and formed on a colored layer is removed according to the method mentioned above, a color filter having a desired color and excellent in the flatness can be obtained.

In the invention, exposing a dicing line, a scribe line and a PAD area may be further disposed. In the exposing, after a color filter layer and an area to be protected are covered with a photoresist layer, ashing or etching is applied to expose. Thereafter, the photoresist layer can be dissolved with an organic solvent and removed. The exposing may be applied after the respective layers are formed or after a colored layer of the last layer is coated, heated and flattened by applying the etch-back or polishing process.

In what follows, one embodiment of a production method for a color filter of the invention will be described with reference to the drawings.]

(a) Forming Colored Layer

As shown in FIG. 1, on a surface of a support 1, a colored heat-curable composition matched to a predetermined color component is coated at a desired film thickness, followed by applying post-baking to form a colored layer 2.

(b) Forming Photoresist Layer

Figure 2:
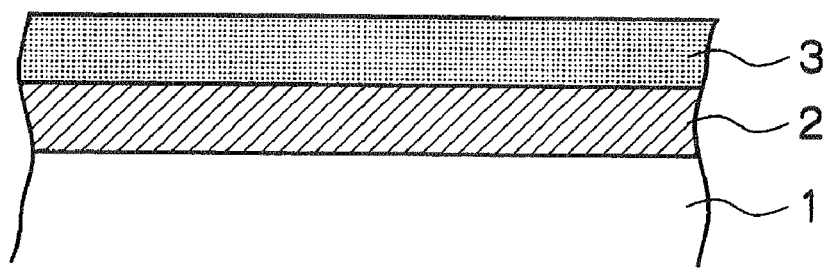
FIG. 2 is a sectional view showing a photoresist layer formed on the colored layer.

As shown in FIG. 2, a positive or negative working photoresist composition is coated on the colored layer 2, followed by applying pre-baking to form a photoresist layer 3 having a desired film thickness.

(c) Forming Image

Figure 3:
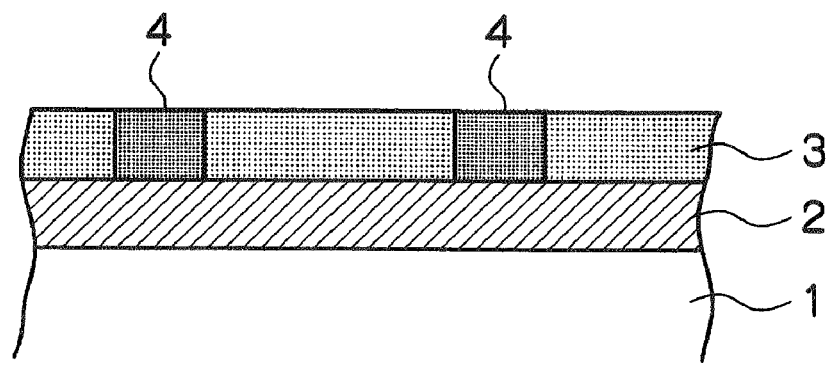
FIG. 3 is a sectional view showing a state where a latent image region is formed in a photoresist layer after exposing.
Figure 4:
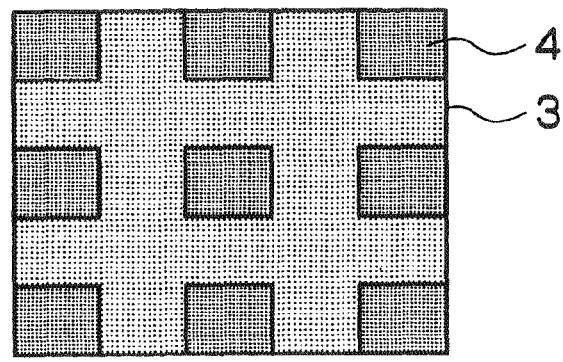
FIG. 4 is a plan view showing FIG. 3 from a surface opposite to a support side.

As shown in FIG. 3, through a photomask having an aperture area corresponding to a predetermined filter array (pixel group) constituted of a second colored layer, the photoresist layer 3 is exposed to form a latent image region 4. FIG. 4 is a plan view showing FIG. 3 from a surface opposite to a support side.

Figure 5:
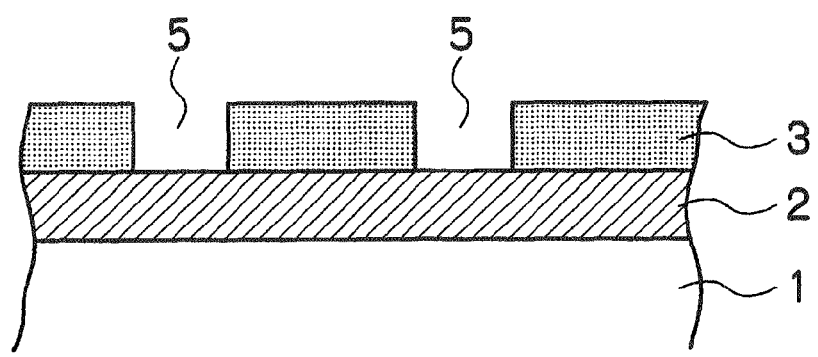
FIG. 5 is a sectional view showing a developed photoresist layer.

A photoresist layer area of the latent image region 4 to be removed is developed and removed. A removed state thereof is shown in FIG. 5. On the support, a colored layer exposed area 5 from which the photoresist layer is removed is formed, the colored layer exposed area 5 corresponds to an area from which the colored layer 2 is to be removed, the photoresist layer is removed only from an area where a second colored layer is formed, and a photoresist layer 3 on the colored layer 2 and on the colored layer on which a third and subsequent colored layers are formed is left.

(d) Etching

Figure 6:
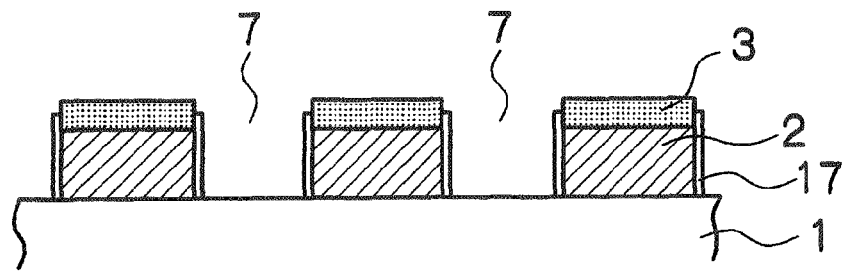
FIG. 6 is a sectional view showing a layer structure after etching.
Figure 7:
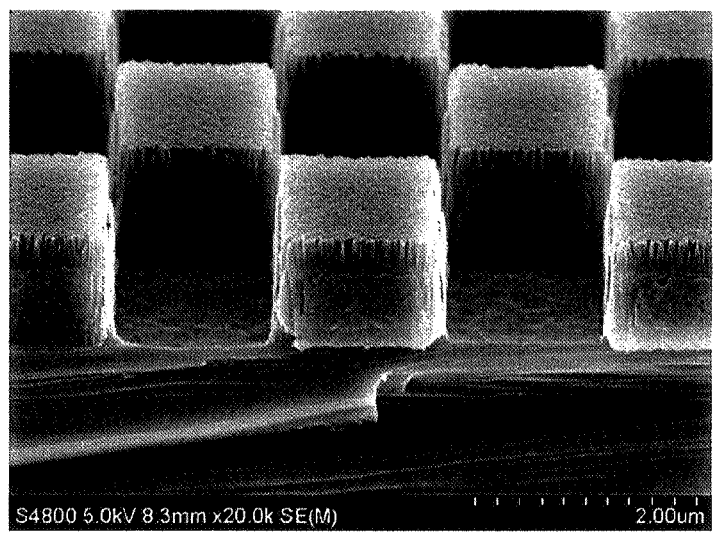
FIG. 7 is a SEM photograph when

In the next place, as shown in FIG. 6, an etching is applied with the photoresist layer 3 as a mask to form an area where a second colored layer is formed (support exposed area 7) by removing the colored layer 2. At this time, on a sidewall of the photoresist layer 3, a deposited area 17 is adhered owing to deposition of an etching product. However, in comparison with an existing photoresist layer where on all sidewall the photoresist layer is stuck, an adhesion of a photoresist layer to a sidewall is suppressed and an upper area of a sidewall of the photoresist layer is exposed. FIG. 7 is a SEM photograph when FIG. 6 is seen from a surface opposite to a support side.

(e) Removing Photoresist Layer

Figure 8:
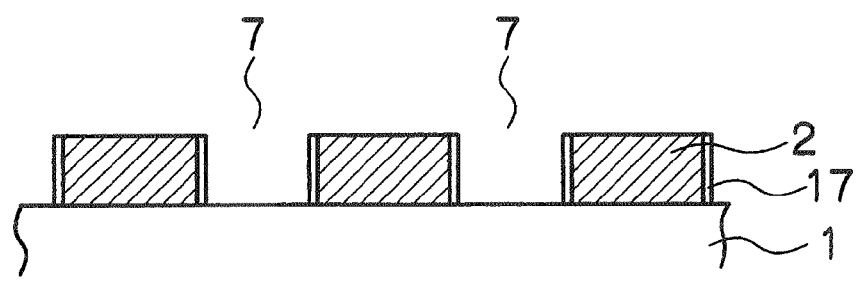
FIG. 8 is a sectional view showing a layer structure after a photoresist layer is removed.
Figure 9:
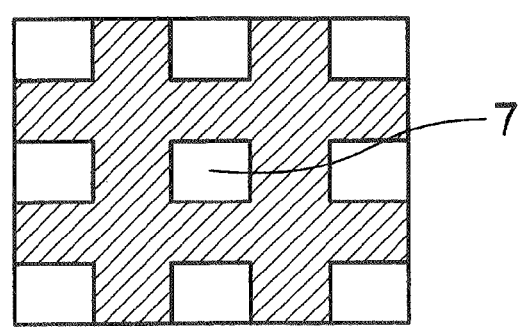
FIG. 9 is a plan view showing FIG. 8 from a surface opposite to a support side.
Figure 10:
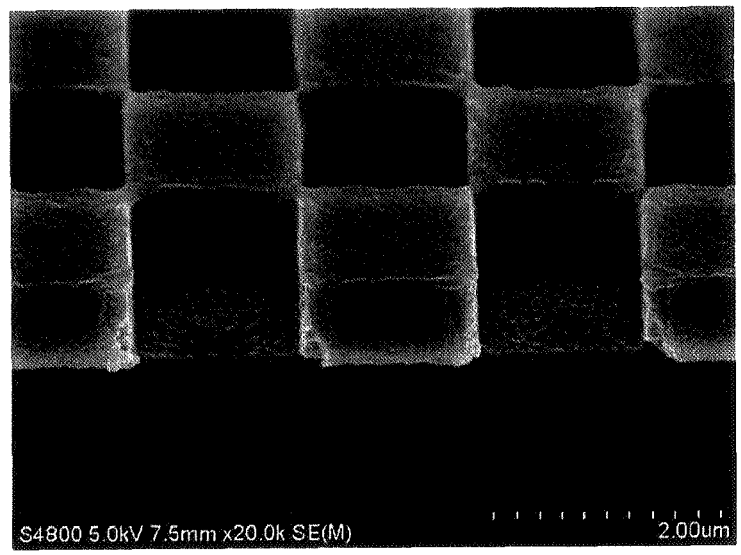
FIG. 10 is a SEM photograph when

After the etching is applied, the photoresist layer 3 is dissolved with a peeling solution and removed. After the photoresist layer is removed, as shown in FIG. 8, only a support exposed area 7 where a second colored layer is formed becomes a shape from which the colored layer 2 is removed. FIG. 9 is a plan view showing FIG. 8 from a surface opposite to a support side. FIG. 10 is a SEM photograph when FIG. 8 is seen from a surface opposite to a support side.

(f) Forming Second Colored Layer

Figure 11:
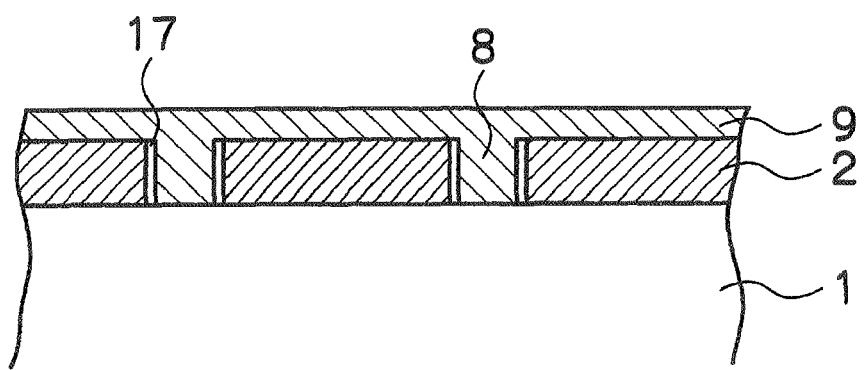
FIG. 11 is a sectional view showing a state where a second colored layer is formed.

As shown in FIG. 11, on a support 1 on which the colored layer 2 is formed, a colored heat-curable composition matched to a color component of a second colored layer 9 is coated at a film thickness by which an area 8 that is a formation area of the second colored layer 9 is buried. Thereafter, the post-baking is applied to form a second colored layer 9.

(b') Forming Photoresist Layer

Though not shown in the drawing, on the second colored layer 9, a positive or negative working photoresist is coated, followed by applying pre-baking, and thereby a photoresist layer is formed again.

(c') Forming Image

Figure 12:
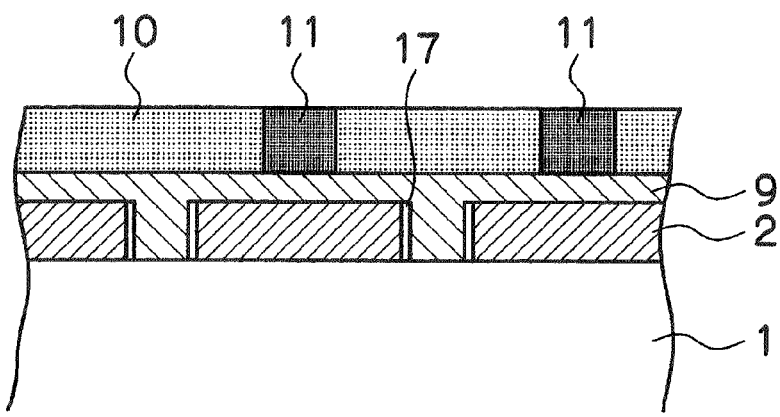
FIG. 12 is a sectional view showing a state where a latent image region is formed in a photoresist layer after exposing.

As shown in FIG. 12, a photoresist layer 10 is exposed through a photomask having an area corresponding to a predetermined filter array (pixel area) that forms a third colored layer to form a latent image region 11. Then, a photoresist layer area of a latent image region 11 to be removed is developed and removed.

Figure 13:
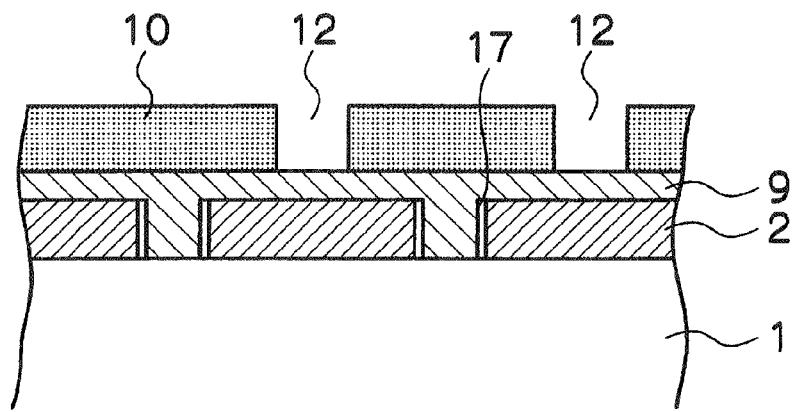
FIG. 13 is a sectional view showing a developed photoresist layer.

As shown in FIG. 13, a colored layer exposed area 12 from which the photoresist layer is removed corresponds to an area from which the first colored layer 2 and the second colored layer 9 are removed. That is, only on an area where a third colored layer is formed, the photoresist layer is removed.

(d') Etching

Figure 14:
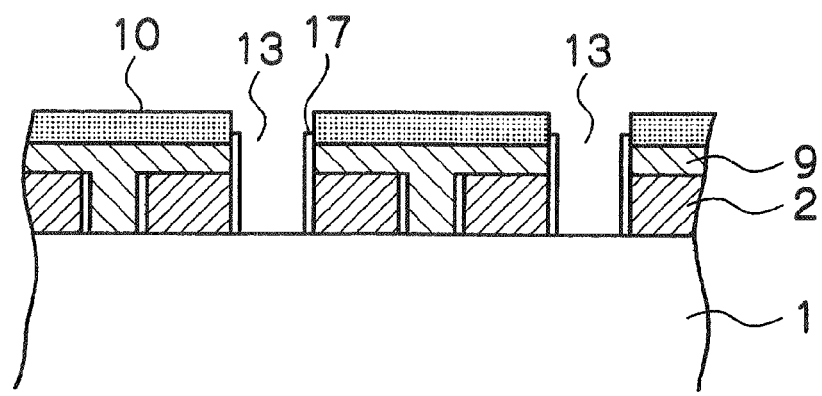
FIG. 14 is a sectional view showing a layer structure after etching.

With a developed photoresist layer 10 as a mask, as shown in FIG. 14, only an area 13 where a third colored layer is formed is etched. At this time, not only the second colored layer 9 but also the colored layer 2 are simultaneously etched and removed, and thereby a support surface of an area (support exposed area 13) for forming a third colored layer is exposed.

(e') Removing Photoresist Layer

Figure 15:
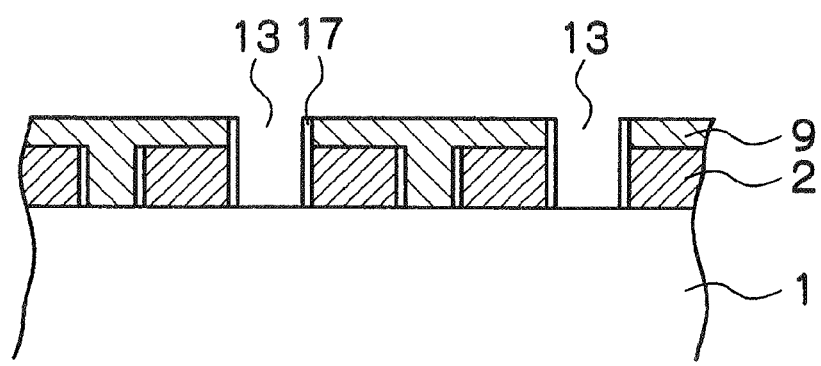
FIG. 15 is a sectional view showing a layer structure after a photoresist layer is removed.
Figure 16:
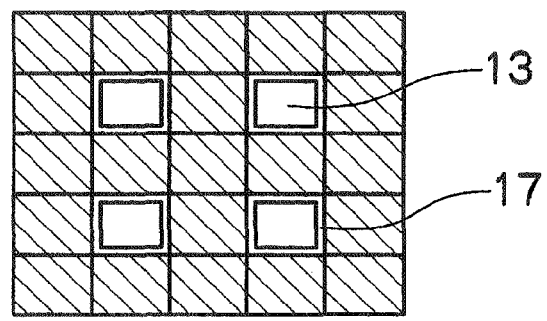
FIG. 16 is a plan view showing FIG. 15 from a surface opposite to a support side.

After the etching is applied, the photoresist layer is dissolved with a peeling solution to remove. After finishing the peeling, as shown in FIG. 15, only from a support exposed area 13 where a third colored layer is formed, the colored layer 2 and the second colored layer 9 are removed. Furthermore, on an area of the colored layer 2, the second colored layer 9 is laminated and formed. FIG. 16 is a plan view showing FIG. 15 from a surface opposite to a support side.

(f') Forming Third Colored Layer

Figure 17:
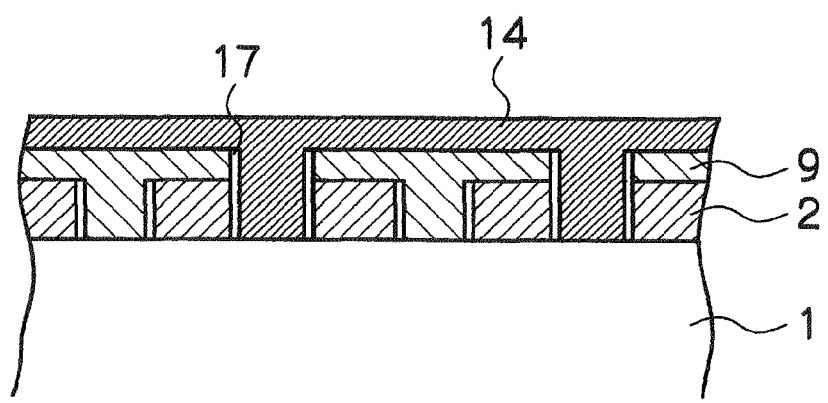
FIG. 17 is a sectional view showing a state where a third colored layer is formed.

As shown in FIG. 17, on a support 1 on which the colored layer 2 and the second colored layer 9 are formed, a colored heat-curable composition matched to a color component of a third colored layer is coated at a film thickness by which an area 13 that is a formation area of a third colored layer is buried. Thereafter, the post-baking is applied to form a third colored layer 14.

(g) Last Processing

Figure 18:
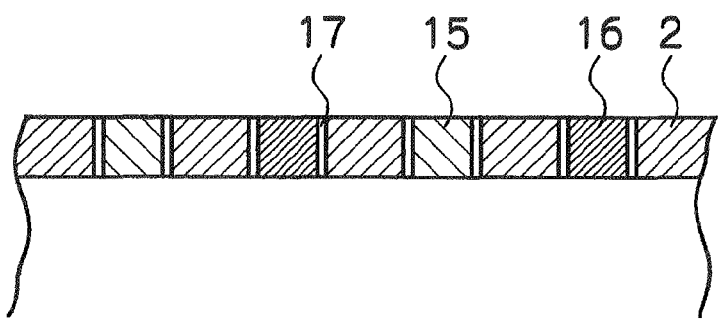
FIG. 18 is a sectional view showing a layer structure of a color filter after the final process.
Figure 19:
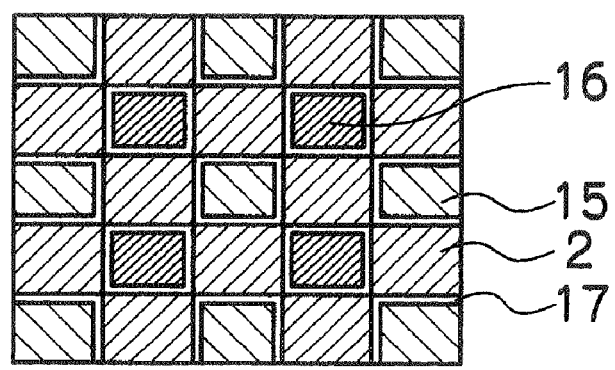
FIG. 19 is a plan view showing FIG. 18 from a surface opposite to a support side.

After forming the third colored layer 14, by applying an etch-back process or CMP process, the etching or polishing is applied until a surface of the colored layer 2 is exposed. Thereby, as shown in FIG. 18, a color filter consisted of a colored layer 2, a second colored layer 15 and a third colored layer 16 is produced. FIG. 19 is a plan view showing FIG. 18 from a surface opposite to a support side.

A color filter prepared according to a production method for a color filter of the invention can be applied to liquid crystal display elements or solid state image pick-up elements such as CCDs and particularly preferably to high-definition CCD elements or CMOSs that exceed one million pixels. The color filter in the invention can be used for example as a color filter disposed between a light-receiving area of each of pixels that constitute a CCD and a microlens for focusing light.

In a production method for a color filter of the invention, in order to realize a film thickness and the adhesiveness close to that obtained in the vapor deposition, at a pigment concentration higher more than ever a spin coater or a slit coater is used to uniformly coat, by altering from the photolithography method to the thermal curing method a solid content other than a colorant is reduced to a limit value to realize thinning and while maintaining the anisotropy of a pattern owing to the dry etching a rectangular pattern is formed. When these are combined, at a thin film thickness that cannot be achieved before, the pattern rectangularity and the adhesiveness can be realized. Furthermore, when a dry etching process that uses a mixed gas in the invention is used, a deposited matter formed on a sidewall area of the photoresist layer can be suppressed from occurring and the photoresist layer remained after the dry etching can be easily peeled. Thus, when a production method for a color filter of the invention is used, a color filter having very high rectangularity in the pattern can be prepared, accordingly the production method is very useful.

EXAMPLES

Hereinbelow, the present invention will be described in detail by way of Examples. However, the invention is not limited to these Examples.

In the respective processes below, when commercially available processing solutions are used, unless clearly stated, the respective processes are carried out according to processes specified by makers.

Example 1

Pattern Formation

[(a) Forming Colored Layer]
A pigment-containing heat-curable composition (trade name: SG-5000L, manufactured by Fuji Film Electronics Materials Co., Ltd.) was coated on a silicon substrate by use of a spin coater at a film thickness of 0.8 μm. Thereafter, the coated film was cured at 220° C. for 5 minutes by using a hot plate. A film thickness of a colored layer formed from the pigment-containing heat-curable composition was 0.65 μm.

[(b) Forming Photoresist Layer]
In the next place, on the colored layer, a positive working photoresist (trade name: FHi622BC, manufactured by Fuji Film Electronics Materials Co., Ltd.) was coated by using a spin coater. Thereafter, the coated film was heated at 100° C. for 2 minutes to form a photoresist layer of 0.8 μm.

[(c) Forming Image]
Then, an area, in the photoresist layer, corresponding to a filter array of RED was exposed with an i-ray stepper (trade name: FPA300015+, manufactured by Cannon Inc.) at 350 mJ/cm$^2$, followed by heating at 110° C. for 1 min. Thereafter, the photoresist layer was developed for 1 minute by using a developing solution "FHD-5" (trade name, manufactured by Fuji Film Electronics Materials Co., Ltd.). Then, Post-baking was performed at 120° C. for 2 min. In this way, the photoresist of an area where a filter array of RED was to be formed was removed to form an island pattern of 1.5 μm×1.5 μm.

[(d) Etching]
In the next place, by using a dry etching apparatus (trade name: U-621, manufactured by Hitachi High Technologies Co., Ltd.), etching was applied under conditions of RF power: 800 W, antenna bias: 400 W, chamber inner pressure: 4.0 Pa, substrate temperature: 50° C., gas species of mixed gas and flow rates thereof: $CF_4$: 80 mL/min., $O_2$: 40 mL/min., Ar: 800 mL/min., $CF_4/O_2/Ar=2/1/20$, and overetch rate: 10%.

[(e) Removing Photoresist Layer]
Subsequently, by using a photoresist peeling solution "MS-230C" (trade name, manufactured by Fuji Film Electronics Materials Co., Ltd.), peeling was applied for 120 sec to remove the photoresist.

Thus, a color filter pattern of single color was formed.

Example 2

In the (d) etching in Example 1, a color filter pattern was formed in a similar manner to Example 1, except that an island pattern was formed instead of a pattern of Bayer array and flow rates of gasses mixed were set at $CF_4$: 200 mL/min., $O_2$: 50 mL/min., Ar: 800 mL/min., $CF_4/O_2/Ar=4/1/16$.

Example 3

In the (d) etching in Example 1, a color filter pattern was formed in a similar manner to Example 1, except that flow rates of gasses mixed were set at $CF_4$: 250 mL/min., $O_2$: 50 mL/min., Ar: 800 mL/min., $CF_4/O_2/Ar=5/1/16$.

Example 4

In the (d) etching in Example 1, a color filter pattern was formed in a similar manner to Example 1, except that flow rates of gasses mixed were set at $CF_4$: 320 mL/min., $O_2$: 40 mL/min., Ar: 1000 mL/min., $CF_4/O_2/Ar=8/1/25$.

Example 5

A color filter pattern was formed in a similar manner to Example 2, except that $CF_4$ was replaced by $C_2F_6$.

Examples 6 to 10

In the (d) etching in Example 2, a color filter pattern was formed in a similar manner to Example 2, except that inner pressure of chamber was set at 1.0, 2.0, 5.0, 6.0 and 7.0 Pa.

Comparative Example 1

In the (d) etching in Example 1, a color filter pattern was formed in a similar manner to Example 1, except that flow rates of gasses mixed were set at $CF_4$: 50 mL/min., $O_2$: 50 mL/min., Ar: 800 mL/min., $CF_4/O_2/Ar=1/1/16$.

Comparative Example 2

In the (d) etching in Example 1, a color filter pattern was formed in a similar manner to Example 1, except that flow rates of gasses mixed were set at $CF_4$: 450 mL/min., $O_2$: 50 mL/min., Ar: 800 mL/min., $CF_4/O_2/Ar=9/1/16$.

Comparative Example 3

In the (d) etching in Example 1, a color filter pattern was formed in a similar manner to Example 1, except that gas species and flow rates of gasses mixed were set at $O_2$: 250 mL/min., $N_2$: 250 mL/min., $O_2/N_2=1/10$.

(Evaluation)
—Peel Property—
About color filter patterns formed in Examples 1 to 10 and Comparative Examples 1 to 3, surface observation with a microscope and surface and sidewall observation with a scanning electron microscope (SEM) were carried out to evaluate. The evaluation was carried out based on evaluation criteria below. Evaluation results are shown in Table 1.

<Evaluation Criteria>

A: No peeling residue of the photoresist was found. That is, the peel property was very good.

B: Slight peeling residue of the photoresist was found. However, the peel property was practically allowable.

C: The peeling residue of the photoresist was found remained over an entire surface. The peel property was poor.

—Rectangularity—

About color filter patterns formed in Examples 1 to 10 and Comparative Examples 1 to 3, observation with a scanning electron microscope (SEM) was carried out (multiplication factor: 100,000 times). The evaluation was carried out based on evaluation criteria below. Evaluation results are shown in Table 1.

<Evaluation Criteria>

A: A section was formed rectangular and over an entirety of a resist sidewall no deposited matter was found.

B: The rectangularity of a section was slightly deteriorated, but over an entirety of a resist sidewall no deposited matter was found. That is, the rectangularity was practically allowable.

C: The rectangularity of a section was very much deteriorated such that the section was formed in a tapered shape, and deposited matter was found over an entirety of a resist sidewall. That is, the rectangularity was practically unacceptable.

According to the invention, production method for a color filter in which adhesion of an etching product onto a sidewall area of the photoresist layer is suppressed and photoresist layer can be easily peeled can be provided.

The present invention includes the following embodiment.

<1> A production method for a color filter, including:

(a) forming a first colored layer on a support;

(b) forming a photoresist layer on the first colored layer;

(c) forming an image on the first colored layer by removing the photoresist layer in the form of an image pattern;

(d) etching the first colored layer in the form of the image formed in the forming the image by use of a dry etching process that uses a mixed gas in which a fluorine-based gas and oxygen ($O_2$) are mixed at a mixing ratio (fluorine-based gas/$O_2$), by flow rate ratio, in the range of from 2/1 to 8/1; and (e) removing the photoresist layer remaining after the etching.

<2> The production method for a color filter as described in <1>, wherein the fluorine-based gas is at least one selected from the group consisting of $CF_4$, $C_4F_8$, $C_2F_6$ and $CHF_3$.

<3> The production method for a color filter as described in <1> or <2>, wherein the mixed gas further includes at least one kind of gas selected from the group consisting of Ar, He, Kr, $N_2$ and Xe at a mixing ratio, by flow rate ratio, of larger than 0 and 25 or less with oxygen ($O_2$) assigned to 1.

<4> The production method for a color filter as described in any one of <1> to <3>, wherein internal pressure of a chamber where a dry etching process is carried out is set in the range of 2.0 to 6.0 Pa to remove the colored layer.

TABLE 1

| | fluorine-based gas | flow rate of fluorine-based gas [mL/min.] | flow rate of $O_2$ [mL/min.] | flow rate of other gas [mL/min.] | flow rate ratio of fluorine-based gas when flow fate of $O_2$ is assigned to 1. | internal pressure of chamber [Pa] | peel property | rectangularity |
|---|---|---|---|---|---|---|---|---|
| Example 1 | $CF_4$ | 80 | 40 | 800 | 2 | 4.0 | A | A |
| Example 2 | $CF_4$ | 200 | 50 | 800 | 4 | 4.0 | A | A |
| Example 3 | $CF_4$ | 250 | 50 | 800 | 5 | 4.0 | A | A |
| Example 4 | $CF_4$ | 320 | 40 | 1000 | 8 | 4.0 | A | A |
| Example 5 | $C_2F_6$ | 200 | 50 | 800 | 4 | 4.0 | A | A |
| Example 6 | $CF_4$ | 200 | 50 | 800 | 4 | 1.0 | A | B |
| Example 7 | $CF_4$ | 200 | 50 | 800 | 4 | 2.0 | A | A |
| Example 8 | $CF_4$ | 200 | 50 | 800 | 4 | 5.0 | A | A |
| Example 9 | $CF_4$ | 200 | 50 | 800 | 4 | 6.0 | A | A |
| Example 10 | $CF_4$ | 200 | 50 | 800 | 4 | 7.0 | A | B |
| Comparative Example 1 | $CF_4$ | 50 | 50 | 800 | 1 | 4.0 | B | B |
| Comparative Example 2 | $CF_4$ | 450 | 50 | 800 | 9 | 4.0 | B | B |
| Comparative Example 3 | — | — | 25 | 250 | — | 4.0 | C | C |

As shown in the Table 1, in color filter patterns of Examples 1 to 10 formed according to a production method for a color filter of the invention, the peel property was excellent and no peeling residue of the photoresist was found in the (e) removing. On the other hand, in Comparative Examples, the peel property was poor and peeling residue of the photoresist was observed.

Furthermore, the color filter patterns of Examples 1 to 10 formed according to a production method for a color filter of the invention were, as shown in FIG. 10, color filter patterns that are high in the rectangularity and suppressed adhesion of a deposited matter on a sidewall area of a photoresist layer.

Figure 20:
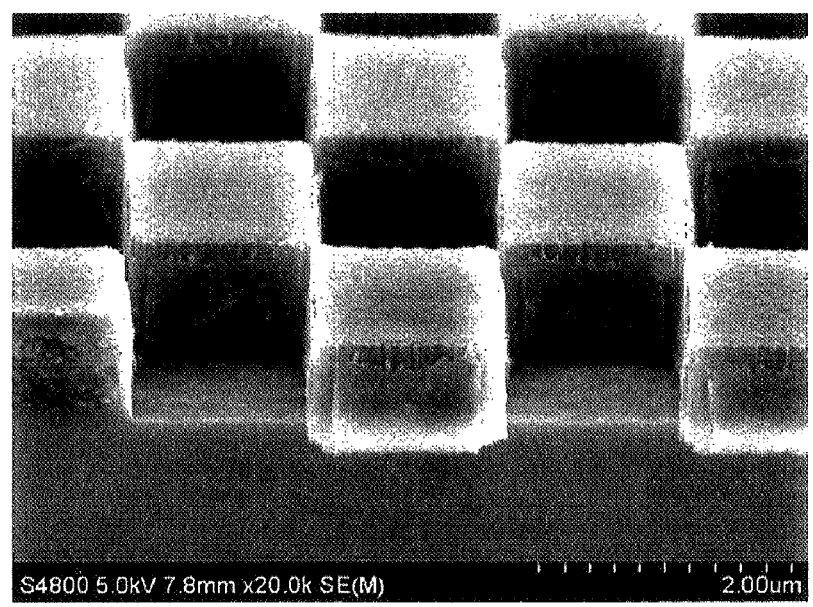
FIG. 20 is a SEM photograph showing a structure of a conventional color filter pattern.

On the other hand, in Comparative Example 3, as shown in FIG. 20, although a color filter pattern could be formed in a Bayer array, the deposited matter was found and a rectangular pattern could not be obtained.

<5> The production method for a color filter as described in any one of <1> to <4>, wherein the first colored layer is formed with a colored heat-curable composition containing a pigment and a thermosetting resin;

the colored heat-curable composition contains the thermosetting resin at a concentration of larger than 0 weight % and 50 weight % or less in a solid content of the colored heat-curable composition; and the colored heat-curable composition contains a pigment dispersion solution in which the pigment is dispersed in a solution containing the thermosetting resin so that a pigment concentration in a total solid content of the colored heat-curable composition is in the range of 50 weight % or more and less than 100 weight %.

<6> The production method of a color filter as described in <5>, wherein the pigment dispersion solution is prepared by carrying out kneading and dispersing in such a manner that a ratio of a solvent to a substance being dispersed is set in the range of 0 to 20 weight % and a binder is added to the pigment so that the viscosity after the kneading and dispersing is 50,000 mPa·s or more, and thereafter, carrying out micro-dispersing in such a manner that a ratio of a solvent to a substance being dispersed is set in the range of 20 to 90 weight % and the viscosity after the micro-dispersing is 1000 mPa·s or less.

<7> The production method for a color filter as described in any one of <1> to <6>, wherein, in the mixed gas, the mixing ratio (fluorine-based gas/$O_2$) of the fluorine-based gas and oxygen ($O_2$), by flow rate ratio, is in the range of from 3/1 to 5/1.

<8> The production method for a color filter as described in any one of <1> to <7>, wherein the removing of the photoresist layer comprises imparting a peeling solution or a solvent on the photoresist layer to make the photoresist layer removable and removing the photoresist layer by washing.

<9> The production method for a color filter as described in any one of <1> to <8>, further comprising:
after the removing of the photoresist layer, (f) forming a second colored layer that is different from the first colored layer formed in the (a) forming of the first colored layer, in an area on the support where the first colored layer has been removed in the etching.

<10> The production method for a color filter as described in <9>, wherein a process including the (b) forming a photoresist layer, the (c) forming an image, the (d) etching, the (e) removing a photoresist layer and the (f) forming a second colored layer is carried out at least two times.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A production method for a color filter, comprising:
    (a) forming a first colored layer on a support;
    (b) forming a photoresist layer on the first colored layer;
    (c) forming an image on the first colored layer by removing the photoresist layer in the form of an image pattern;
    (d) etching the first colored layer in the form of the image formed in the forming the image by use of a dry etching process that uses a mixed gas in which a fluorine-based gas and oxygen ($O_2$) are mixed at a mixing ratio (fluorine-based gas/$O_2$), by flow rate ratio, in the range of from 2/1 to 8/1; and
    (e) removing the photoresist layer remaining after the etching.

2. The production method for a color filter according to claim 1, wherein the fluorine-based gas is at least one selected from the group consisting of $CF_4$, $C_4F_8$, $C_2F_6$ and $CHF_3$.

3. The production method for a color filter according to claim 1, wherein the mixed gas further includes at least one kind of gas selected from the group consisting of Ar, He, Kr, $N_2$ and Xe at a mixing ratio, by flow rate ratio, of larger than 0 and 25 or less with oxygen ($O_2$) assigned to 1.

4. The production method for a color filter according to claim 1, wherein internal pressure of a chamber where a dry etching process is carried out is set in the range of 2.0 to 6.0 Pa to remove the colored layer.

5. The production method for a color filter according to claim 1, wherein
    the first colored layer is formed with a colored heat-curable composition containing a pigment and a thermosetting resin;
    the colored heat-curable composition contains the thermosetting resin at a concentration of larger than 0 weight % and 50 weight % or less in a solid content of the colored heat-curable composition; and
    the colored heat-curable composition contains a pigment dispersion solution in which the pigment is dispersed in a solution containing the thermosetting resin so that a pigment concentration in a total solid content of the colored heat-curable composition is in the range of 50 weight % or more and less than 100 weight %.

6. The production method for a color filter according to claim 5, wherein the pigment dispersion solution is prepared by carrying out kneading and dispersing in such a manner that a ratio of a solvent to a substance being dispersed is set in the range of 0 to 20 weight % and a binder is added to the pigment so that the viscosity after the kneading and dispersing is 50,000 mPa·s or more, and thereafter, carrying out micro-dispersing in such a manner that a ratio of a solvent to a substance being dispersed is set in the range of 20 to 90 weight % and the viscosity after the micro-dispersing is 1000 mPa·s or less.

7. The production method for a color filter according to claim 1, wherein, in the mixed gas, the mixing ratio (fluorine-based gas/$O_2$) of the fluorine-based gas and oxygen ($O_2$), by flow rate ratio, is in the range of from 3/1 to 5/1.

8. The production method for a color filter according to claim 1, wherein the removing of the photoresist layer comprises imparting a peeling solution or a solvent on the photoresist layer to make the photoresist layer removable and removing the photoresist layer by washing.

9. The production method for a color filter according to claim 1, further comprising:
    after the removing of the photoresist layer, (f) forming a second colored layer that is different from the first colored layer formed in the (a) forming of the first colored layer, in an area on the support where the first colored layer has been removed in the etching.

10. The production method for a color filter according to claim 9, wherein a process including the (b) forming a photoresist layer, the (c) forming an image, the (d) etching, the (e) removing the photoresist layer and the (f) forming a second colored layer is carried out at least two times.

11. The production method for a color filter according to claim 2, wherein the fluorine-based gas is $CF_4$.

12. The production method for a color filter according to claim 1, wherein the colored layer comprises a dye.

13. The production method for a color filter according to claim 1, wherein the first colored layer is etched in step (d) to form an island pattern of Bayer array.

* * * * *